(12) United States Patent
Studor et al.

(10) Patent No.: US 10,271,680 B2
(45) Date of Patent: Apr. 30, 2019

(54) FROTHING ASSEMBLY AND METHOD OF OPERATING THE SAME

(71) Applicant: BRIGGO, INC., Austin, TX (US)

(72) Inventors: Charles F. Studor, Austin, TX (US); Brent Clafferty, Georgetown, TX (US); Stephen A. Miller, Austin, TX (US); Marwan Hassoun, Sudbury, MA (US); Pete P. Garcia, Jr., Georgetown, TX (US); Lynn Warren Hamrick, Leander, TX (US)

(73) Assignee: BRIGGO, INC., Austin, TX (US)

( * ) Notice: Subject to any disclaimer, the term of this patent is extended or adjusted under 35 U.S.C. 154(b) by 329 days.

(21) Appl. No.: 14/854,410

(22) Filed: Sep. 15, 2015

(65) Prior Publication Data

US 2016/0000259 A1    Jan. 7, 2016

Related U.S. Application Data

(63) Continuation of application No. PCT/US2014/028773, filed on Mar. 14, 2014.
(Continued)

(51) Int. Cl.
| | | |
|---|---|---|
| *A47J 31/44* | (2006.01) | |
| *B01F 3/04* | (2006.01) | |
| *B01F 15/00* | (2006.01) | |

(52) U.S. Cl.
CPC ....... *A47J 31/4489* (2013.01); *B01F 3/04248* (2013.01); *B01F 3/04446* (2013.01);
(Continued)

(58) Field of Classification Search
CPC ..... A47J 31/56; A47J 31/4485; A47J 31/4489
(Continued)

(56) References Cited

U.S. PATENT DOCUMENTS 4,735,133 A * 4/1988 Paoletti ............... A47J 31/4489
239/427.3
4,852,474 A * 8/1989 Mahlich ............. A47J 31/4489
261/121.1
(Continued)

FOREIGN PATENT DOCUMENTS

| EP | 1221883 B1 | 11/2005 |
|---|---|---|
| EP | 2389848 A1 | 11/2011 |

(Continued)

OTHER PUBLICATIONS

Results of internet (google) search for "Frothing Wand Holes" filtered for results purportedly dated prior to Mar. 15, 2013. The search results can be found at: www.google.com/search?q=frothing+wand+holes&client=firefox-a&rls=org.mozilla%3Aen-US%3Aofficial&channel=sb&biw=1120&bih=570&source=lnt&tbs=cdr%3A1%2Ccd_min%3A%2Ccd_max%3A03%2F15%2F2013&tbm=ischg, 22 pages, accessed Jul. 31, 2014.

(Continued)

*Primary Examiner* — Jimmy Chou
(74) *Attorney, Agent, or Firm* — Reising Ethington P.C.

(57) ABSTRACT

An automated frothing assembly. The automated frothing assembly has a wand module that includes an elongate member having an inlet, one or more outlets, and a fluid passageway extending between and in fluid communication with the inlet and the plurality of outlets. At least one of the one or more outlets extends parallel to a vertical plane that includes the centerline of the elongate member and at an acute angle relative to a horizontal plane that is perpendicular to both the vertical plane and the centerline of the elongate member. The assembly further includes an actuator configured to be operatively coupled to the wand module and to drive the movement of at least a portion of the wand module along an axis, and an electronic controller config- (Continued)

ured to be electrically coupled to the actuator and to control the operation of the actuator to control the movement of the wand module.

16 Claims, 10 Drawing Sheets

Related U.S. Application Data

(60) Provisional application No. 61/792,396, filed on Mar. 15, 2013.

(52) U.S. Cl.
CPC .... *B01F 3/04992* (2013.01); *B01F 15/00025* (2013.01); *B01F 15/00253* (2013.01); *B01F 15/00967* (2013.01); *B01F 2003/04319* (2013.01); *B01F 2003/04361* (2013.01); *B01F 2215/0006* (2013.01)

(58) Field of Classification Search
USPC ... 99/293, 277.1, 283, 294, 280, 323.1, 453; 134/22.11
See application file for complete search history.

(56) References Cited

U.S. PATENT DOCUMENTS

| | | | | |
|---|---|---|---|---|
| 4,949,631 A * | 8/1990 | Fregnan | ............ | A47J 31/4485 261/DIG. 26 |
| 5,233,915 A * | 8/1993 | Siccardi | ............ | A47J 31/4489 239/520 |
| 5,330,266 A * | 7/1994 | Stubaus | ............ | A47J 31/4485 261/DIG. 76 |
| 5,699,718 A * | 12/1997 | Yung | ............ | A47J 31/306 99/290 |
| 5,738,002 A * | 4/1998 | Marano-Ducarne | | A47J 31/4485 261/DIG. 76 |
| 5,769,135 A * | 6/1998 | Mahlich | ............ | A47J 31/4489 141/70 |
| 5,785,256 A * | 7/1998 | Mahlich | ............ | A47J 31/4489 239/552 |
| 6,293,187 B1 * | 9/2001 | Zils | ............ | A47J 31/4482 99/293 |
| 6,443,374 B1 * | 9/2002 | Astachow | ............ | F02M 61/184 239/533.2 |
| 6,626,086 B2 * | 9/2003 | Eugster | ............ | A47J 31/4485 261/DIG. 76 |
| 6,786,138 B2 * | 9/2004 | Johnson | ............ | A47J 31/4489 141/82 |
| 7,507,430 B2 * | 3/2009 | Stearns | ............ | A47J 31/41 426/474 |
| 8,944,287 B2 * | 2/2015 | Reyhanloo | ............ | A47J 31/4485 222/66 |
| 8,960,080 B2 * | 2/2015 | Saito | ............ | A47J 31/4489 261/DIG. 16 |
| 8,973,435 B2 * | 3/2015 | Preston | ............ | A47J 31/46 73/202 |
| 8,991,795 B2 * | 3/2015 | Studor | ............ | B01F 3/04446 261/26 |
| 9,560,931 B2 * | 2/2017 | Cingolani | ............ | A47J 31/4489 |
| 9,629,496 B2 * | 4/2017 | Constantine | ........ | A47J 31/4489 |
| 2010/0047406 A1 * | 2/2010 | Reyhanloo | ............ | A47J 31/4485 426/231 |
| 2010/0154648 A1 * | 6/2010 | Angeletti | ............ | A47J 31/4489 99/293 |
| 2010/0236416 A1 * | 9/2010 | Bonsch | ............ | A47J 31/4485 99/280 |
| 2011/0048462 A1 * | 3/2011 | Morin | ............ | A47J 31/4489 134/22.11 |
| 2011/0113973 A1 * | 5/2011 | Ishida | ............ | B67D 1/0071 99/323.1 |
| 2012/0000372 A1 * | 1/2012 | Vanni | ............ | A47J 31/4489 99/323.1 |
| 2012/0073449 A1 * | 3/2012 | Volonte | ............ | A47J 31/4489 99/323.1 |
| 2012/0104038 A1 * | 5/2012 | Quaratesi | ............ | A47J 31/4489 99/277.2 |
| 2012/0156337 A1 * | 6/2012 | Studor | ............ | A47J 31/44 426/231 |
| 2012/0305674 A1 * | 12/2012 | Buehner | ............ | F02M 61/168 239/533.2 |
| 2013/0061763 A1 * | 3/2013 | Piai | ............ | A47J 31/44 99/295 |
| 2013/0112085 A1 * | 5/2013 | Turchi | ............ | A47J 31/4489 99/300 |
| 2014/0299003 A1 * | 10/2014 | Cingolani | ............ | A47J 31/4489 99/453 |
| 2015/0335195 A1 * | 11/2015 | Beaudet | ............ | A47J 31/4403 99/293 |

FOREIGN PATENT DOCUMENTS

| | | |
|---|---|---|
| EP | 2433527 A1 | 3/2012 |
| JP | 2002334374 A | 11/2002 |
| WO | WO0103559 A1 | 1/2001 |
| WO | WO03092458 A1 | 11/2003 |

OTHER PUBLICATIONS

International Search Report for application No. PCT/US2014/028733, dated Jul. 24, 2014, 3 pages.
Written Opinion for application No. PCT/US2014/028733, dated Jul. 24, 2014, 12 pages.

* cited by examiner

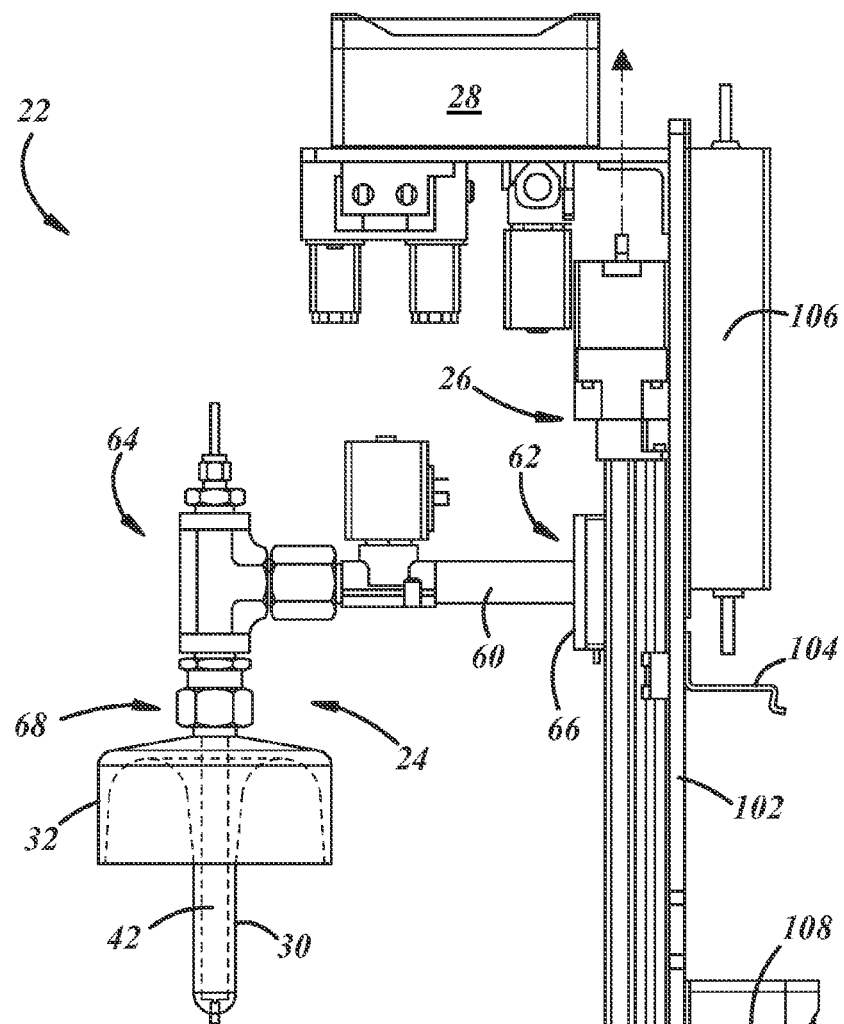
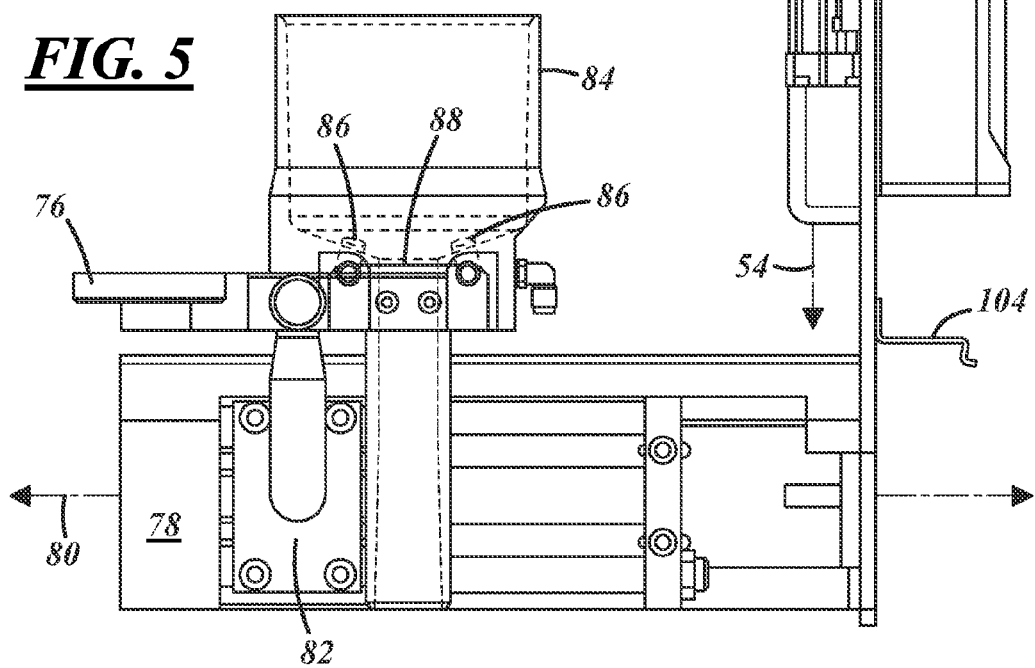
FIG. 5

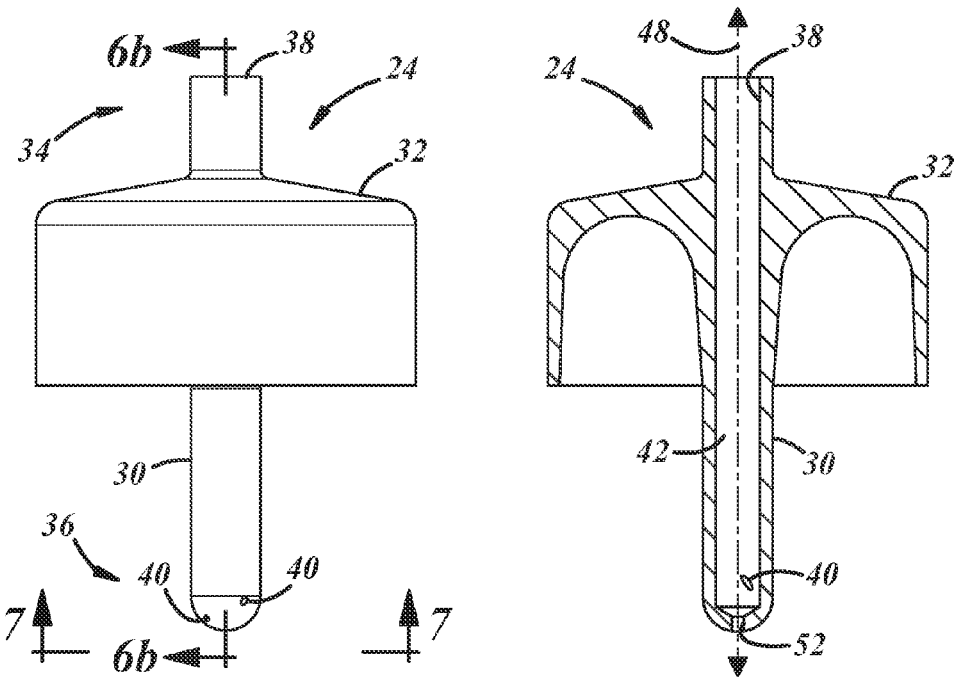
FIG. 6a  FIG. 6b
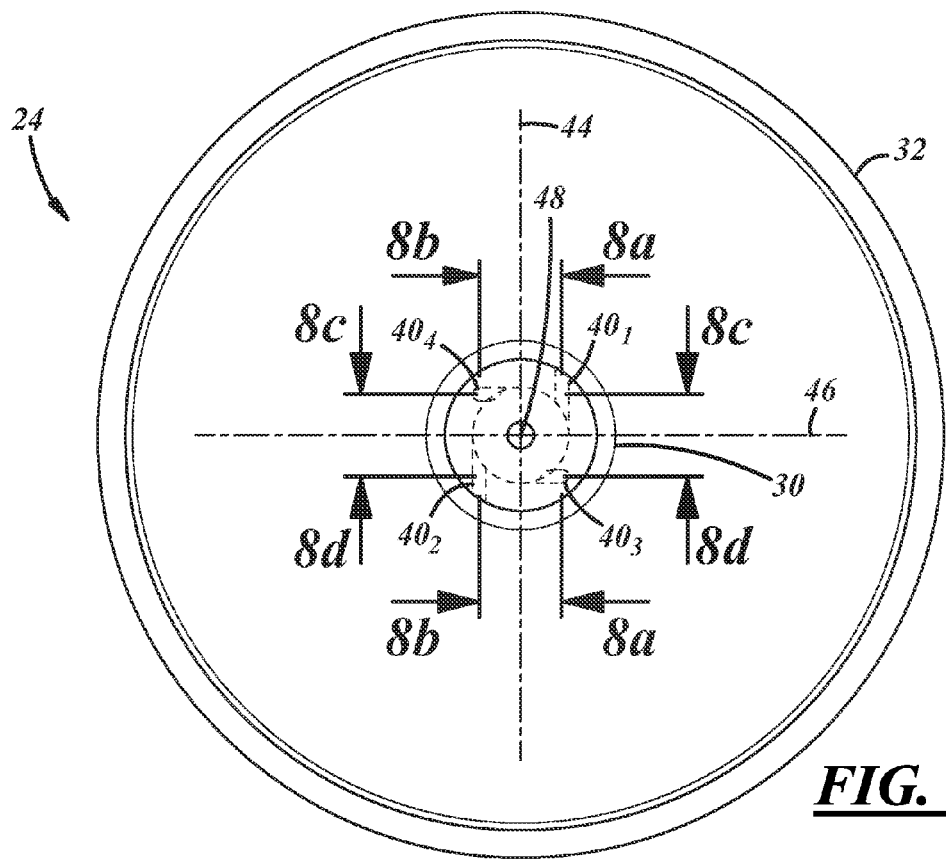
FIG. 7

FROTHING ASSEMBLY AND METHOD OF OPERATING THE SAME

CROSS-REFERENCE TO RELATED APPLICATION

This application is a continuation of PCT Application No. PCT/US2014/028733 filed on Mar. 14, 2014, which claims the benefit of U.S. Provisional Application No. 61/792,396 filed Mar. 15, 2013. Each of the aforementioned applications are incorporated herein by reference in their entireties.

TECHNICAL FIELD

This disclosure relates generally to the generation of beverages, and more particularly, to frothing assemblies and methods of operating the same that are used in, and contribute to, the generation of beverages.

BACKGROUND

It is well known that when generating or producing certain types of beverages—especially various types of coffee-based beverages, a frothing process may be performed one or more constituent components or ingredients of those beverages. Frothing is a process by which liquid, for example, milk, is aerated by rapidly agitating it to introduce air into the liquid. This process creates bubbles within the liquid being frothed that makes a light texture and increases the volume of the liquid. The result of such a process is a foamy mixture that may help cut through some of the dense, sharp flavor of, for example, strong coffee used in cappuccinos, lattes, and other like coffee-based beverages.

To that end, automated beverage generating systems that are configured to generate or produce beverages requiring a frothing process to be performed on one or more ingredients thereof may include one or more automated frothing modules or assemblies that are configured to perform such a process. The aim of such frothing assemblies is to replicate the frothing process that a human barista would be perform if the beverage was to be ordered at a brick and mortar coffee house. A challenge faced by frothing assemblies of automated beverage generating machines is to make the frothing process the assembly performs an automated, consistent, and repeatable process.

SUMMARY

According to one embodiment, there is provided an automated frothing assembly. The frothing assembly comprises a wand module that includes an elongate member having an inlet, at least one outlet, and a fluid passageway extending between and in fluid communication with the inlet and the at least one outlet. The assembly further comprises an actuator configured to be operatively coupled to the wand module and to drive the movement of at least a portion of the wand module along an axis, and an electronic controller configured to be electrically coupled to the actuator and to control the operation of the actuator to control the movement of the wand module.

According to another embodiment, there is provided a wand module for use in performing a frothing process on a liquid in container. The wand module comprises an elongate member having an inlet, one or more outlets, and a fluid passageway extending between and in fluid communication with the inlet and the plurality of outlets. At least one of the one or more outlets extends parallel to a vertical plane that includes the centerline of the elongate member and at an acute angle relative to a horizontal plane that is perpendicular to both the vertical plane and the centerline of the elongate member.

According to another embodiment, there is provided an automated frothing assembly. The frothing assembly comprises a wand module. The wand module includes an elongate member having an inlet, one or more outlets, and a fluid passageway extending between and in fluid communication with the inlet and the plurality of outlets. At least one of the one or more outlets extends parallel to a vertical plane that includes the centerline of the elongate member and at an acute angle relative to a horizontal plane that is perpendicular to both the vertical plane and the centerline of the elongate member. The assembly further comprises an actuator configured to be operatively coupled to the wand module and to drive the movement of at least a portion of the wand module along an axis, and an electronic controller configured to be electrically coupled to the actuator and to control the operation of the actuator to control the movement of the wand module.

According to another embodiment, there is provided a method for determining one or more operating parameters of a frothing process to be performed by a frothing assembly. The method comprises acquiring one or more characteristics relating to the liquid to be frothed and/or the beverage of which that liquid is a part. The method further comprises determining one or more operating parameters for the frothing process using the acquired characteristic(s), and then performing the frothing process in accordance with the determined parameter(s). In an embodiment, the step of determining one or more operating parameters comprises determining a frothing profile containing a plurality of operating parameters.

According to another embodiment, there is provided a method for performing a cleaning process on one or more components of a frothing assembly. The method comprises orienting the component(s) of the frothing assembly with a cleaning container. The method further comprises inserting at least a portion of the component(s) into the cleaning container, and then directing cleaning fluid onto at least a portion of the outer surface of the portion of that or those component(s) disposed within the cleaning container. The method may further comprise retracting the component(s) from the cleaning container.

According to another embodiment, there is provided a method for determining amounts or volumes of one or more milk products to be used in generating a specified beverage. The method comprises receiving one or more electrical signal(s) representative of the specified beverage. The method further comprises determining one or more characteristic(s) of the specified beverage and using the characteristic(s) to determine a total expected volume of a liquid at a particular point in the beverage generation process. The method still further comprises determining a desired overall total fat content of the specified beverage, and determining a total volume and/or fat content of one or more additives used in the specified beverage. The method yet still further comprises determining the amount(s) or volume(s) of the one or more milk products based at least on the desired overall fat content of the specified beverage and the total volume and/or fat content of the additives.

BRIEF DESCRIPTION OF THE DRAWINGS

One or more embodiments of the invention will hereinafter be described in conjunction with the appended drawings, wherein like designations denote like elements, and wherein:

FIG. 5 is a side elevation view of the frothing assembly illustrated in FIG. 2;

FIG. 6a is an elevation view of an illustrative embodiment of a wand module that may be used in the frothing assembly illustrated in FIGS. 2-5;

FIG. 6b is a cross-sectional view of the wand module illustrated in FIG. 6a taken along the lines 6b-6b in FIG. 6a;

FIG. 7 is a bottom plan view of the wand module illustrated in FIG. 6a;

DETAILED DESCRIPTION OF ILLUSTRATED EMBODIMENTS

The methods and systems described herein may be used to generate or produce beverages, such as, for example and without limitation, brewed beverages (e.g., hot or cold brewed beverages). For purposes of this disclosure, the phrase "brewed beverages" or "brewed beverage" is intended to mean any consumable beverage that is made through a process in which a liquid and one or more ingredients are combined though one or more of mixing, stirring, boiling, steeping, infusion, frothing, pressurization, and/or fermentation over a prescribed period of time. Examples of brewed beverages include, but are not limited to, coffee, tea, espresso, and beer. It will be appreciated that while the description below is primarily with respect to the production of brewed beverages, the present disclosure is not meant to be so limited. Rather, the methods and systems described herein may also be used to produce other types of prepared beverages, such as, for example, hot chocolate and energy drinks, to name a few. In any event, the system may be implemented as, and the methods may be performed by, a single, fully-automated kiosk such as, for example, that or those described in U.S. Pat. No. 8,515,574 issued on Aug. 20, 2013 and U.S. Patent Publication No. 2013/0087050 published on Apr. 11, 2013, the contents of each of which are hereby incorporated by reference in their entireties. The systems and methods described herein may be used to, among other things, establish a production schedule for beverages ordered through the system, and to then use that or those schedules to prepare of generate the ordered beverage(s). The apparatus and methods described herein may be used to, among other things, perform and/or control frothing processes on one or more ingredients or constituent components of beverages, for example, coffee- or espresso-based beverages, as well as to clean or clean and sanitize one or more components of the frothing apparatus.

Figure 1:
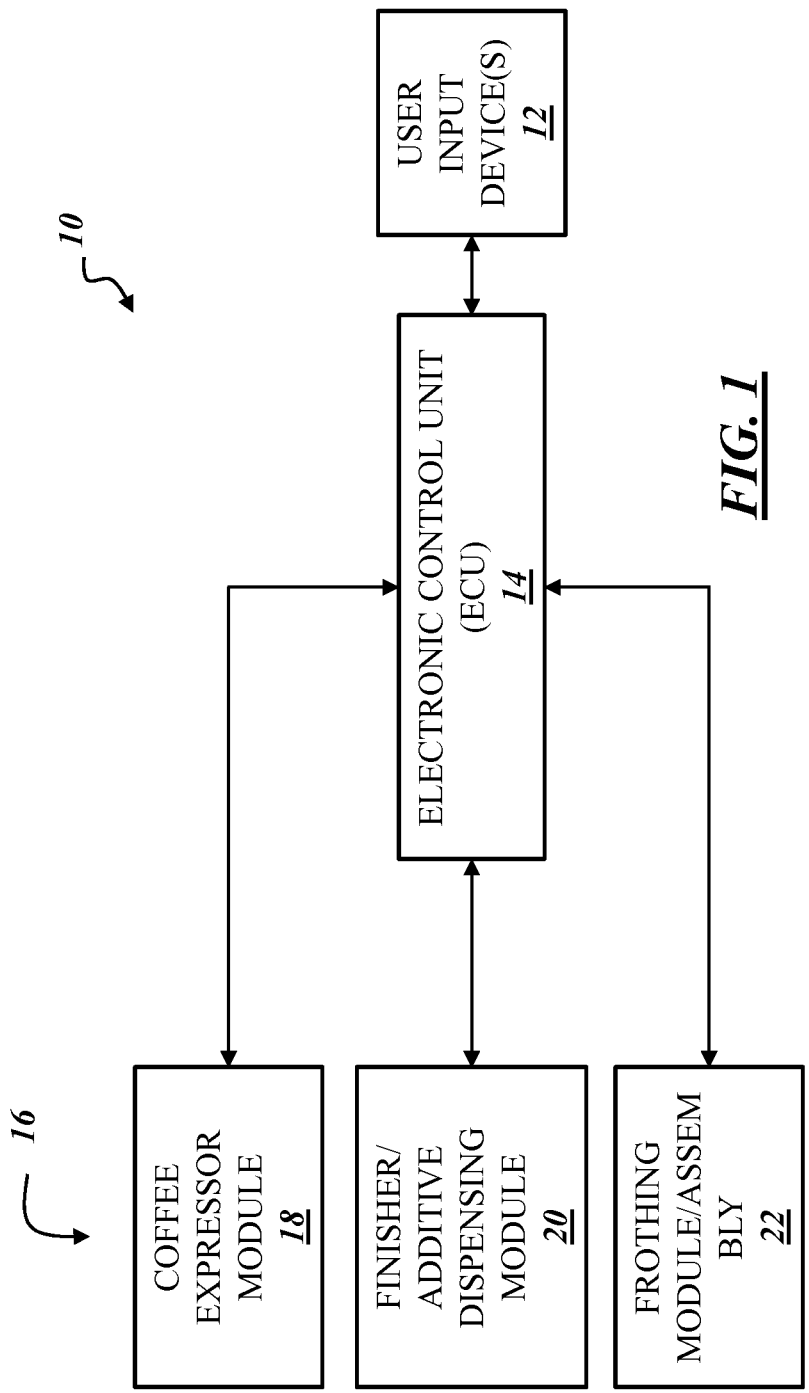
FIG. 1 is a schematic and diagrammatic view of an illustrative embodiment of an automated system for generating beverages.

Referring now to the drawings wherein like reference numerals are used to identify identical or similar components in the various views, FIG. 1 depicts a block diagram of an illustrative embodiment of an automated beverage generating system 10 (i.e., kiosk 10). As described in detail in U.S. Pat. No. 8,515,574 issued on Aug. 20, 2013 and U.S. Patent Publication No. 2013/0087050 incorporated by reference above, and as will be summarized below, the kiosk 10 may comprise a plurality of components or modules that may allow for a fully automated kiosk having the functionality to, in general terms, take ground coffee or beans as an input and generate a fully lidded brewed beverage as an output (the lidding step may be optional). To that end, the kiosk 10 may include or be configured to support, among any number of other components, one or more user input devices 12, an electronic control unit 14 (ECU 14), and one or more process components or modules 16.

As shown in the example illustrated in FIG. 1, the kiosk 10 may include or support one or more user input devices 12. In an embodiment, the user input device 12 may be disposed within the outer housing or enclosure of the kiosk 10, or disposed in close proximity thereto, such that part of the kiosk 10 itself and is accessible to customers; while in another embodiment, the user input device 12 may be separate and distinct from the structure of the kiosk 10 (e.g., the device 12 may be remotely located from the kiosk 10, for example, in an instance where the user input 12 comprises a handheld device such as a smart phone). In any event, the user input device 12 may be directly or indirectly electrically connected to (e.g., hardwired or wirelessly), and configured for communication with, the ECU 14 of the kiosk 10, and may comprise or include any number of devices suitable to display or provide information to and/or receive information from a customer. In any event, the user input device 12 is operable to provide an interactive interface that allows a customer to interact with other components of the kiosk 10 for various purposes, such as, for example, to allow a customer to place an order for a desired beverage.

The ECU 14 of the kiosk 10 may comprise one or more electronic processing units and one or more electronic memory devices. In another embodiment, rather than or in addition to the ECU 14 comprising a memory device, kiosk 10 may include one or more memory devices that are separate and distinct from the ECU 14 (and the processing unit(s) thereof, in particular) but that is/are accessible thereby. The processing unit of the ECU 14 may include any type of suitable electronic processor (e.g., a programmable microprocessor or microcontroller, an application specific integrated circuit (ASIC), etc.) that is configured to execute appropriate programming instructions for software, firmware, programs, algorithms, scripts, etc., to perform various functions, such as, for example and without limitation, one or more steps of the methodologies described herein. The memory device, whether part of the ECU 14 or separate and distinct therefrom, may include any type of suitable electronic memory means and may store a variety of data and information. This includes, for example: software, firmware, programs, algorithms, scripts, and other electronic instructions that, for example, are required to perform or cause to be performed one or more of the functions described elsewhere herein (e.g., that are used (e.g., executed) by ECU 14 to perform various functions described herein); various data structures; operating parameters and characteristics of the kiosk 10 and/or one or more components thereof (e.g., information such as parameters, characteristics, etc., relating to ingredients used in or by the kiosk 10; beverage recipes; etc.). Alternatively, rather than all of the aforementioned information/data being stored in a single memory device, in an embodiment, multiple suitable memory devices may be provided.

In any event, the aforementioned instructions may be provided as a computer program product, or software, that may include a non-transitory, computer-readable storage medium. This storage medium may have instructions stored thereon, which may be used to program a computer system (or other electronic devices, for example, the ECU 14) to implement the control some or all of the functionality described herein, including one or more steps of the methodology described below. A computer-readable storage medium may include any mechanism for storing information in a form (e.g., software, processing application) readable by a machine (e.g., a computer, processing unit, etc.). The computer-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical, or other types of medium suitable for storing program instructions. In addition, program instructions may be communicated using optical, acoustical, or other form of propagated signal (e.g., carrier waves, infrared signals, digital signals, or other types of signals or mediums.).

As will be described below, the ECU 14 may be electronically connected to other components of the kiosk 10 via I/O devices and suitable connections, such as, for example, a communications bus or a wireless link, so that they may interact as required. It will be appreciated, however, that the present disclosure is not meant to be limited to any one type of electronic connection, but rather any connection that permits communication between the ECU 14 and other components of the kiosk 10 may be utilized.

The ECU 14 may be configured to perform, or cause to be performed, some or all of the functionality of the kiosk 10, including, for example, some or all of those functions and features described herein (e.g., one or more steps of the method(s) described below). For example, in an embodiment, the ECU 14 may be configured to receive a request for the generation of a beverage from the user input device 12 and to then effect the generation of the specified beverage by controlling (directly or indirectly) the operation of, for example, one or more of the modules 16 of the kiosk 10 required to generate the specified beverage. To facilitate the interaction and communication between the ECU 14 and other components of system 10 such as the user input device 12, the ECU 14 may comprise one or more network or communication interfaces that may include or be electronically connected to, and configured for communication with, other infrastructure of the kiosk 10 (e.g., known components/devices such as, for example, routers, modems, antennas, electrical ports, transceivers, etc.) configured to facilitate and support one or more types of communication networks or techniques/protocols known in the art.

It will be appreciated by those having ordinary skill in the art that while in an embodiment the ECU 14 may be a single component, in some embodiments, the functionality of the ECU 14 may be performed or caused to be performed by more than one ECU or other like component. For example, in an embodiment, the kiosk 10 may comprise a plurality of ECUs, each one of which is configured to perform or cause to be performed different functionality. In such an embodiment, the various ECUs may be electronically connected to each other to allow for communication therebetween, and each may be configured to also communicate with other components of the kiosk 10 through, for example, dedicated network interfaces or other components thereof, or common network interface(s) of the kiosk 10. In another embodiment, the kiosk 10 may include a number of ECUs configured to control different functionality of the kiosk 10 (e.g., one or more of the modules 16 may have a dedicated or shared ECU), but also includes a "master" ECU that is configured to manage and control the operation of the individual ECUs so as to have a coordinated, multi-tiered control scheme for the kiosk 10. In such an embodiment, the master ECU may be the sole ECU that is configured to interface with other components of the kiosk 10, or alternatively, the individual dedicated ECUs may also be configured to interface with one or more other components of the kiosk 10.

As discussed above, the kiosk 10 may include one or more components or modules 16 (also known or referred to as "process modules," "control process modules," "execution modules," and "resource modules"). Each module 16 is configured to perform one or more processes (e.g., chemical or mechanical processes) required for generating or producing brewed beverages. In an illustrative embodiment, each module 16 is configured to perform one or more different processes than that or those performed by the other module(s) 16.

The modules 16 may take any number of forms. For example, and as illustrated in FIG. 1, one type of module is a coffee expressor module 18 that is configured, for example, to brew coffee. Another type of module is a finisher or additive dispensing module 20 that is configured, for example, to dispense one or more refrigerated or non-refrigerated additives required for various beverages (e.g., flavored syrup, dairy (e.g., cold milk), ice, sweeteners, water, etc.). Yet another type of module is a frothing module or assembly 22 that is configured to perform a frothing process on one or more component ingredients of a specified beverage and which will be described in greater detail below. Other types of modules may include, but are not limited to, a cup dispenser (denester), a lidding module, and a label module, among possibly others. Accordingly, in an illustrative embodiment, the kiosk 10 includes an array of modules 16 that are configured to perform a variety of beverage production-related processes.

As was briefly described above, in an embodiment, the operation of each module 16 may be at least partially controlled by the ECU 14. In such an embodiment, each module 16 is electronically connected to, and configured for communication with, the ECU 14. It will be appreciated as described above, however, that in other embodiments, one or more of the modules 16, or one or more of the components thereof, may be alternatively controlled by a dedicated ECU that, as described above, is under the control of the ECU 14, or by another ECU of the kiosk 10 or a larger system of which the kiosk 10 is a part.

In view of the foregoing, it will be apparent that some or all of the components of the kiosk 10 are interconnected to allow for communication and exchange of information therebetween. In an embodiment, these interconnected components may be connected to a central interconnect (e.g., a communication bus), or alternatively, one or more components may be electronically connected (e.g., by one or more wires or cables, or wirelessly) directly to one or more other components. In an embodiment wherein a central interconnect is used, it is through this interconnect that the ECU 14 may receive feedback and other inputs from various components of the kiosk 10 (e.g., modules 16) and may issue commands or provide information to those components.

As briefly mentioned above, the kiosk 10 may include one or more frothing assemblies 22. With reference to FIGS. 2-5, in an illustrative embodiment, the frothing assembly 22 generally comprises a wand module 24, an actuator 26 configured to drive the movement of the wand module 24 (or at least a portion thereof), and an electronic controller 28 configured to control at least the operation of the actuator 26, and therefore, the movement of the wand module 24. Depending on the particular implementation, the frothing assembly 22 may also include any number of additional components, some of which are described below. These components may include, for example and without limitation: a container holder configured to receive and hold a container in which liquid that is to be frothed by the frothing assembly 22 is disposed; a cleaning container for use in cleaning one or more components of the frothing assembly 22, for example, the wand module 24; an actuator configured to drive the movement of the container holder and/or cleaning container; one or more fluid sources, for example, one or more steam generators and/or cleaning fluid sources; and one or more sensors, for example, temperature sensor(s), weight-measuring device(s), and/or liquid level sensor(s), to cite a few possibilities. Accordingly, it will be appreciated that the present disclosure is not intended to be limited to any one particular implementation of the frothing assembly 22.

FIGS. 6a and 6b depict elevation and cross-sectional views, respectively, of the wand module 24. The wand module 24 may comprise an elongate member 30 and a splash guard or shroud 32. The elongate member 30 is configured to be inserted into a liquid that is to be frothed by the frothing assembly 22 and to allow fluid, for example, air or steam, to be introduced or injected into the fluid to promote the frothing process. In an embodiment, the elongate member 30 is constructed of polytetrafluoroethylene (PTFE); though it will be appreciated that any suitable material may be used instead or in addition to PTFE. Further, the elongate member 30 may have any number of shapes or cross-sectional shapes. For example, in an illustrative and non-limiting embodiment such as that described below, the elongate member 30 comprises an elongate tubular member (i.e., referred to below as tubular member 30) having a circular cross-section. It will be appreciated, however, that while the discussion below will be limited to an embodiment wherein the elongate member 30 is a tubular member, in other embodiments, the elongate member 30 may have a shape other than tubular. Accordingly, the present disclosure is not intended to be limited to an elongate member having any particular shape.

With continued reference to FIGS. 6a and 6b, the tubular member 30 includes a first end 34 and a second end 36 opposite the first end. The tubular member 30 may further include: an inlet 38 disposed at or proximate the first end 34 (e.g., at the first end or a location between the first end and, for example, the center point between the first and second ends 34, 36); one or more outlets 40, each of which is disposed at or proximate the second end 36 (e.g., at second end or one or more locations between the second end and, for example, a center point between the first and second ends 34, 36); and a fluid passageway 42 extending between and in fluid communication with the inlet 38 and the outlet(s) 40.

As will be described in greater detail below, the inlet 38 is configured to be fluidly coupled to one or more fluid sources (e.g., steam, air, water, cleaning fluid, etc.) to allow fluid(s) to be introduced into the tubular member 30 and the fluid passageway 42 thereof, in particular. It will be appreciated that while the embodiment illustrated in FIG. 6b includes a single fluid passageway 42 and a single inlet 38, in other embodiments the tubular member 30 may include multiple fluid passageways and/or inlets, and such embodiments remain within the spirit and scope of the present disclosure.

As will also be described in greater detail below, the outlet(s) 40 are configured to allow fluid (e.g., steam, air, water, cleaning fluid, etc.) introduced into the fluid passageway 42 via the inlet 38 to be passed or injected into the liquid being frothed. The outlet(s) 40 may be oriented and/or arranged relative to the tubular member 30 and, if applicable, each other, such that fluid (e.g., steam) injected into the liquid through the outlet(s) 40 creates a vortex in the liquid in the manner described below. Each outlet 40 may comprise a through-going passageway extending from an inside or interior surface of the tubular member 30 through an outside or exterior surface of the tubular member 30. In an embodiment, each outlet 40 may have a particular diameter (e.g., approximately 0.062 inches); alternatively, the tubular member 30 may have a plurality of outlets 40 having different diameters.

The outlet(s) 40 may be oriented and/or arranged in a number of ways. For example, in an embodiment, at least one outlet 40 may be arranged or oriented such that it extends through the tubular member 30 in a direction parallel to a vertically-extending plane that contains the centerline of the tubular member 30. In an embodiment, the outlet(s) 40 may also extend at an acute angle relative to a horizontal plane that is perpendicular to the vertical plane containing the centerline of the tubular member 30, and the centerline itself (e.g., a horizontal plane that, in one illustrative and non-limiting example, such as the embodiment illustrated in FIGS. 6a-7d, is tangential to the axial-most endpoint of the second end 36 of the tubular member 30). In other words, the outlet(s) 40 extend(s) along a vertical plane that is displaced or offset from a vertical plane containing the centerline, and may also be angled vertically (e.g., downwardly or upwardly from the interior surface to the exterior surface of the tubular member 30) relative to a horizontal plane. For purposes of this disclosure, the term "vertical" or "vertically" connotes the direction in which the length of the tubular member extends and "horizontal" or "horizontally" connotes a direction that is perpendicular or normal to the direction in which the length of the tubular member extends.

In an embodiment wherein the tubular member 30 includes a plurality of outlets 40, each outlet 40 may extend along different vertical planes that are each parallel to a different vertical plane containing the centerline, such that the outlets 40 are laterally-spaced (e.g., circumferentially-spaced) from one another. Alternatively, two or more outlets 40 may extend in the different vertical planes (or the same plane) that are parallel to the same centerline-containing vertical plane. Additionally, each outlet 40 may extend at different angles relative to the horizontal plane, or, alternatively, two or more outlets 40 may extend at the same angle. Accordingly, any number of arrangements and orientations may be used.

To better illustrate the above, FIG. 7 depicts a bottom plan view of an illustrative embodiment of the wand module 24 having a first vertically-extending plane 44 and a second vertically-extending plane 46, wherein the planes 44, 46 are orthogonal to each other, and each includes the centerline 48 of the tubular member 30 of the wand module 24. In this embodiment, the tubular member 30 includes a plurality of outlets 40, and more specifically, two four (4) outlets (i.e., outlets $40_1$, $40_2$, $40_3$, $40_4$.

Figure 8A:
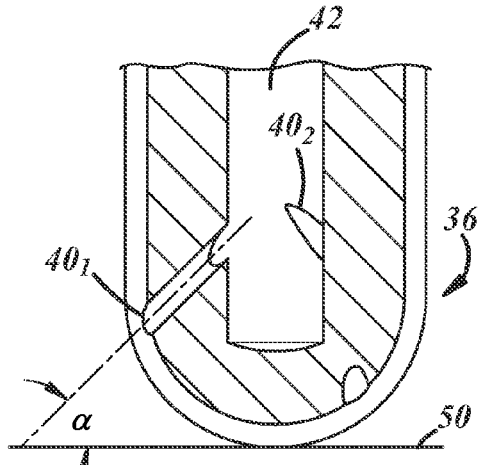
FIGS. 8a-8d are cross-sectional views of the wand module illustrated in FIG. 6a taken along the lines 8a-8a, 8b-8b, 8c-8c, and 8d-8d, respectively, in FIG. 7.
Figure 8B:
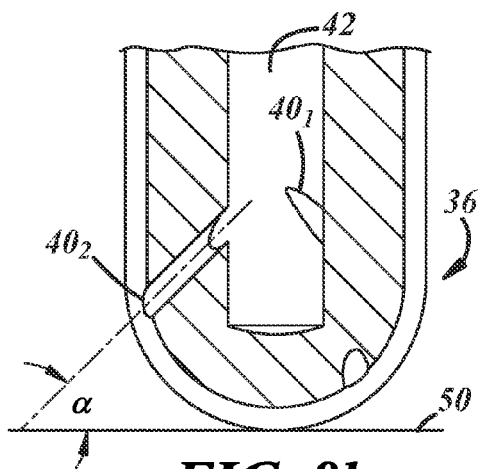

With reference to FIGS. 7, 8a, and 8b, in the illustrated embodiment, a first pair of outlets, outlets $40_1$, $40_2$, are parallel to both each other (i.e., extend in parallel vertical planes) and the vertically-extending plane 44. In this embodiment, the outlet $40_1$ extends in a vertical plane represented by the cross-sectional cut line 8a-8a in FIG. 7, which vertical plane does not contain the centerline of the tubular member 30. Similarly, in this embodiment, the outlet $40_2$ extends in a vertical plane represented by the cross-sectional cut line 8b-8b in FIG. 7, which plane also does not contain the centerline of the tubular member 30. The outlets $40_1$, $40_2$ are also laterally-spaced (e.g., circumferentially-spaced) from each other, but are located the same distance from the axial-most endpoint of the second end 36 of the tubular member 30 (i.e., from the horizontal plane 50, which, in at least the illustrated embodiment, is tangential to this axial-most endpoint). Each outlet $40_1$, $40_2$ also extends through the tubular member 30 at an angle α relative to the horizontal plane 50, which, in an illustrative embodiment, is 45°. In an embodiment, the angle α is such that the trajectory of the fluid passed through each outlet $40_1$, $40_2$ is not perpendicular to the inner surface of the container, or, in the instance where the inner surface is curved, is not perpendicular to the tangent plane at the intersection of the centerline or longitudinal axis of each outlet $40_1$, $40_2$ and the container surface, when the tubular member 30 is properly oriented or positioned within the container.

Figure 8C:
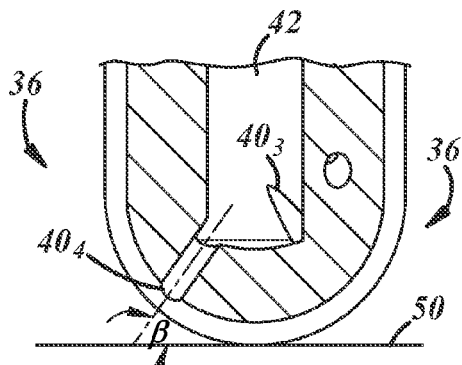
Figure 8D:
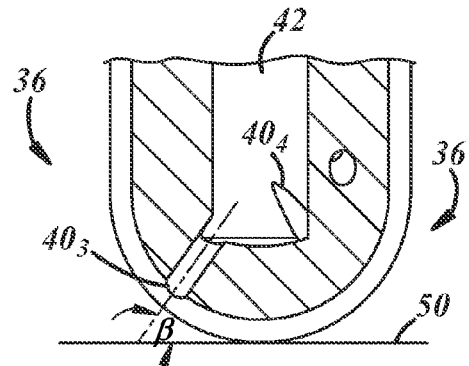

Similarly, and with reference to FIGS. 7, 8c, and 8d, the outlets $40_3$, $40_4$ are parallel to both each other (i.e., extend in parallel vertical planes) and the vertically-extending plane 46, which is orthogonal to vertical plane 44. In this embodiment, the outlet $40_3$ extends in a vertical plane represented by the cross-sectional cut line 8d-8d in FIG. 7, which vertical plane does not contain the centerline of the tubular member 30. Similarly, in this embodiment, outlet $40_4$ extends in a vertical plane represented by the cross-sectional cut line 8c-8c in FIG. 7, which plane also does not contain the centerline of the tubular member 30. The outlets $40_3$, $40_4$ are also laterally-spaced (e.g., circumferentially-spaced) from each other, and are located the same distance from the axial-most endpoint of the second end 36 of the tubular member 30 (i.e., from the horizontal plane 50, which, in at least the illustrated embodiment, is tangential to this axial-most endpoint). As will be appreciated in view of FIGS. 8a-8d, in an embodiment, the distance from the axial-most endpoint of the second end 36 at which the outlets $40_3$, $40_4$ are located is less than that at which the outlets $40_1$, $40_2$ are located, and therefore, in the illustrated embodiment, the outlets $40_1$, $40_2$ are axially-spaced from the outlets $40_3$, $40_4$. In addition to the above, each outlet $40_3$, $40_4$ also extends through the tubular member 30 at an angle β relative to the horizontal plane 50, which, in an illustrative embodiment, is 55°. In an embodiment, the angle β is such that the trajectory of the fluid passed through each outlet $40_3$, $40_4$ is not perpendicular to the inner surface of the container, or, in the instance where the inner surface is curved, is not perpendicular to the tangent plane at the intersection of the centerline or longitudinal axis of each outlet $40_3$, $40_4$ and the container surface, when the tubular member 30 is properly oriented or positioned within the container.

When the tubular member 30 with the outlet arrangement described above is positioned within the container and engages the liquid, and fluid is injected into the liquid through the outlets 40, a swirling action is created in the liquid that is both up-and-down (vertical) and circular in nature so as to promote the formation of a vortex in the liquid and the folding over of the liquid on top of itself. The intended result of this activity is the creation of a homogeneous micro-foam that is appealing visually and has the mouth-feel of hand frothed liquid. Additionally, the outlet arrangement is such that when the tubular member 30 is inserted a certain distance or depth into the liquid to be frothed, the arrangement allows for two of the outlets (i.e., outlets $40_3$, $40_4$) to be submerged below the surface of the liquid, while the other two outlets (i.e., outlets $40_1$, $40_2$) are positioned above the liquid surface. As a result, air may be injected into the liquid by the outlets above the surface, while the outlets below the surface provide the force to create a vortex in the liquid.

While the particular outlet arrangement illustrated in FIGS. 7 and 8a-8d was provided above, it will be appreciated that the present disclosure is not intended to be limited to such an embodiment. Rather, in other embodiments, the outlets $40_1$-$40_4$ may be arranged in one or more other suitable manners. For example, the outlets $40_1$, $40_2$ may not be parallel to each other or the same vertically-extending plane, may be disposed at different distances from the axial-most endpoint of the second end 36 of the tubular member 30, and/or may extend through the tubular member 30 at different angles relative to the horizontal plane 50. The same also applies to the outlets $40_3$, $40_4$. Accordingly, the present disclosure is not intended to be limited to any particular arrangement of the outlets $40_1$-$40_4$, but rather any suitable arrangement that promotes the formation of a vortex in the liquid being frothed and the folding of the liquid over on top of itself in the manner described above may be used.

Further, while one particular outlet arrangement comprised of four (4) outlets 40 was described in detail above, the present disclosure is not limited to an embodiment wherein the tubular member includes four outlets. Rather, in other embodiments, the tubular member 30 may include less than or more than four outlets so long as the they may be arranged in a manner that is suitable to promote the formation of a vortex in the liquid being frothed and the folding over of the liquid on top of itself in the manner described above. Accordingly, the present disclosure is not limited to any particular number of outlets or outlet arrangements.

In any event, in addition to the above, the tubular member 30 may also include one or more outlets that extend parallel to the centerline of the tubular member 30. For example, and as illustrated in FIG. 6b, the tubular member 30 may include at least one outlet, outlet 52, disposed at the second end 36 of the tubular member 30 (e.g., the axial-most endpoint of the second end 36) that extends through the tubular member 30 in a direction that is parallel to the centerline 48 of the tubular member 30.

As briefly described above, the wand module 24 may further include one or more components in addition to the tubular member 30. With reference to FIG. 6a, for example, one such component is the splash guard or shroud 32. As the name would suggest, the splash guard 32 is operative to prevent, or at least substantially limit, liquid from being sprayed or expelled out of the container in which it is contained during a frothing process being performed on the liquid. Accordingly, in an embodiment, the inner diameter of the splash guard 32 is sized so as to allow the splash guard 32 to be placed over the top or rim of the container such that the top portion of the container is circumscribed by the splash guard 32. Similarly, and as will be described more fully below, the splash guard 32 is also operable to prevent water or other cleaning solutions or agents used during a cleaning process performed on the wand module 24 from spraying out of the cleaning container of the frothing assembly 22 during a cleaning process being performed on the wand module 24 or one or more components thereof (e.g., the tubular member 30). In an embodiment, the outer diameter of the splash guard 32 is sized so as to be greater than the inner diameter of cleaning container to allow the splash guard 32 to be inserted into the cleaning container.

The splash guard 32 may be integrally formed with the tubular member 30, or may be a separate and distinct component that is mechanically coupled or affixed to the tubular member 30, using, for example, an adhesive, one or more mechanical fasteners, and/or any other suitable component(s) or device(s). As with the tubular member 30, the splash guard 32 may be formed or constructed of any number of materials, for example, PTFE or any other suitable material.

Figure 2:
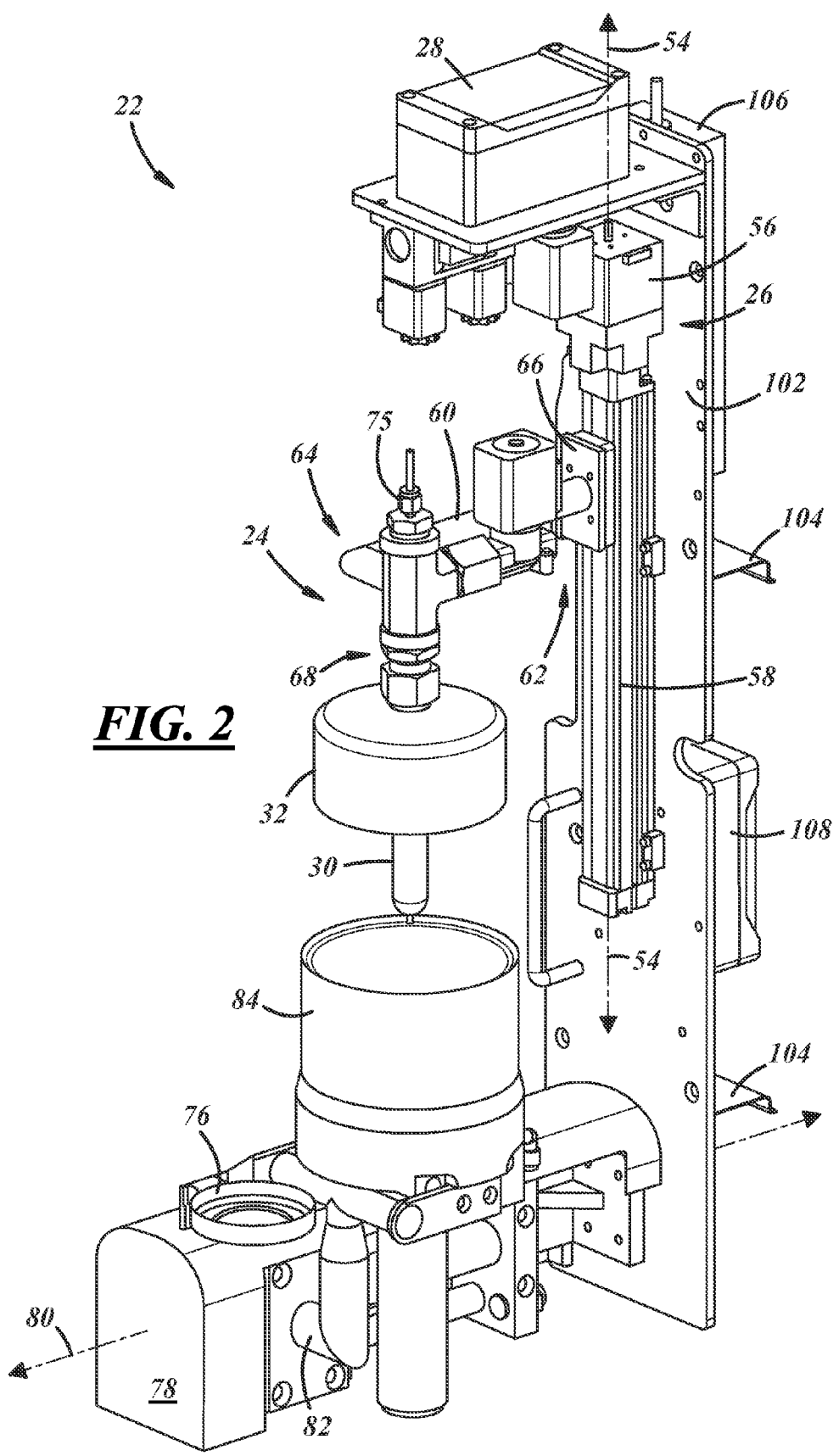
FIG. 2 is a perspective view of an illustrative embodiment of a frothing module or assembly that may be used in an the system illustrated in FIG. 1.
Figures 3, 4:
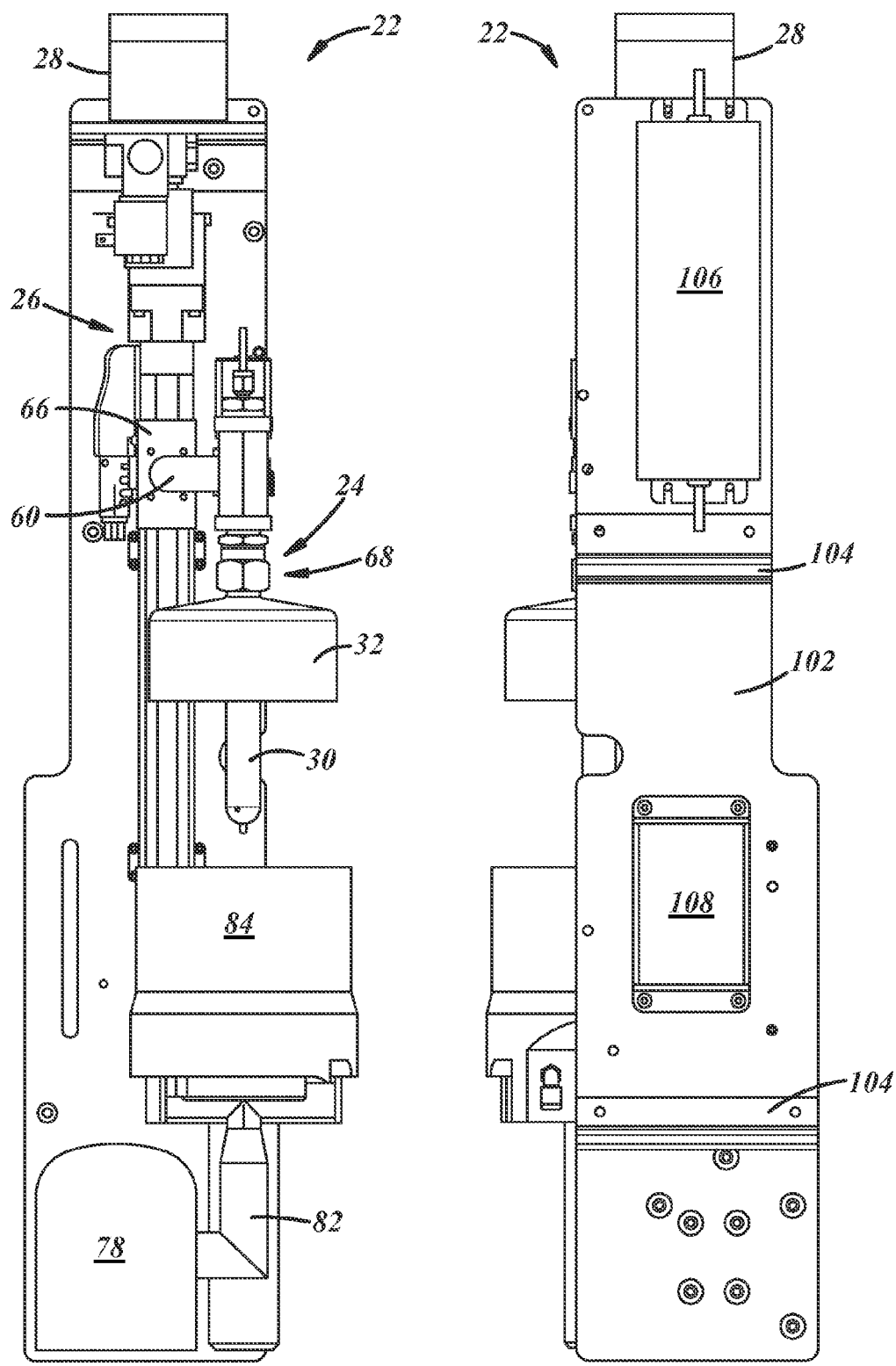
FIG. 3 is a front elevation view of the frothing assembly illustrated in FIG. 2.
FIG. 4 is a back elevation view of the frothing assembly illustrated in FIG. 2.

With reference to FIGS. 2, 3, and 5, in addition to the wand module 24 described above, the frothing assembly 22 may further include the actuator 26. The actuator 26 is configured to be operatively coupled to the wand module 24 and to drive the movement of at least a portion of the wand module 24 along an axis 54. In an embodiment, the axis 54 is a vertical axis, and the actuator 26 is configured to drive the wand module 24 up and down along that axis. Accordingly, and as will be described in greater detail below, when a container containing a liquid to be frothed arrives at the frothing assembly 22, the actuator 26 may move the wand module 24, in a downward direction to allow the tubular member 30 to be inserted into the container and to engage the liquid therein. The actuator 26 may then move the wand module 24 in an upward direction to remove the tubular member 30 from the liquid and the container at an appropriate time. The actuator 26 may also move the wand module 24 up and/or down to move the tubular member 30 to different depths in the liquid during the frothing process, as required. Similarly, when a cleaning process (also referred to as a "cleaning-in-place" or "CIP" process) is to be performed, the actuator 26 may move the wand module 24 in a downward direction to allow the tubular member 30 and, if applicable, the splash guard 32, to be inserted into a cleaning container of the assembly 22. When the cleaning process is completed, the actuator 26 may then move the wand module 24 in an upward direction to remove the tubular member 30 and, if applicable, the splash guard 32, from the cleaning container. It is also contemplated that the actuator 26 may move the wand module 24 up and/or down to different heights during the cleaning process.

The actuator 26 may take any number of forms or comprise any number of different types of actuators. In an illustrative embodiment such as that depicted in FIGS. 2-3, the actuator 26 may comprise a motor-driven linear actuator, for example, a motor (e.g., stepper motor) driven ball screw, that is comprises a motor 56 that is configured to drive the translation of a ball screw, and therefore, the translation of the wand module 24 along a track 58. It will be appreciated, however, that other suitable types of actuators—motor-driven or electrically-operated, and otherwise (e.g., pneumatic, hydraulic, etc.)—may also be utilized.

As described above, the actuator 26 is configured to be operatively coupled to the wand module 24. It will be understood that as used herein, the phrase "operatively coupled" is intended to encompass both the direct coupling of one component to another (e.g., the direct coupling of the actuator 26 to the wand module 24), as well as the indirect coupling of one component to another via one or more intermediate components. Accordingly, two components that are "operatively coupled" together may be either directly or indirectly coupled. In the embodiment illustrated in FIGS. 2, 3, and 5, the actuator 26 and the wand module 24 are indirectly coupled together via a mounting arm 60.

Figure 9:
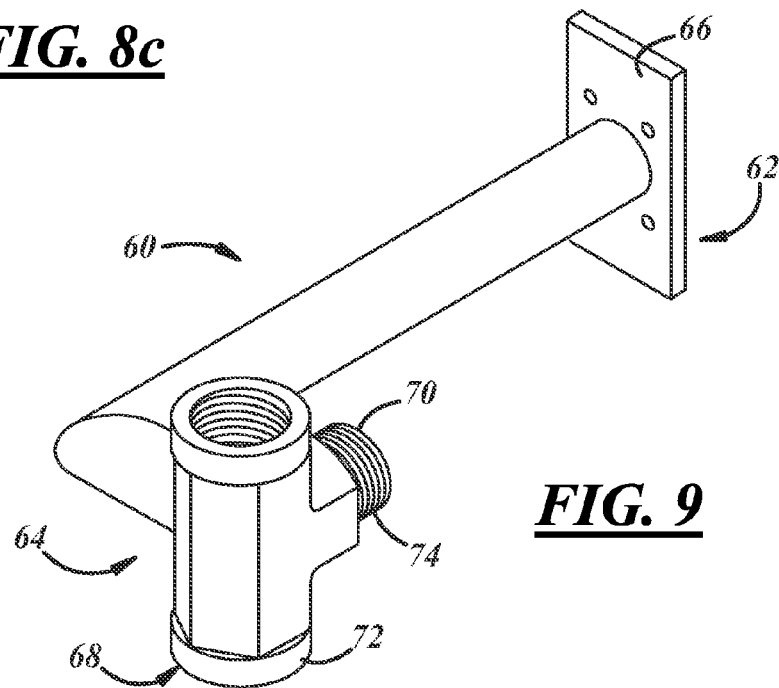
FIG. 9 is an illustrative embodiment of a mounting arm that may be used in the frothing assembly illustrated in FIGS. 2-5 to mount the wand module illustrated in FIG. 6 to an actuator of the frothing assembly.

The mounting arm 60 is configured to impart the movement of the actuator 26 to the wand module 24. In the embodiment illustrated in FIG. 2, for example, the mounting arm 60 is configured to import the linear movement of the actuator 26 along the axis 54 to the wand module 24. As illustrated in FIG. 9, in an embodiment, the mounting arm 60 has a first end 62 and a second end 64. The mounting arm 60 may include a mounting bracket 66 at the first end 62 that is configured to mount the mounting arm 60 to the actuator 26. The mounting arm 60 may further include a coupling means at the second end that is configured to couple the wand module 24 to the mounting arm 60. The coupling means may comprise, for example, a threaded portion or fitting 68 that is configured to be mated with a complementary threaded portion or fitting associated with the wand module 24. It will be appreciated, however, that any number of suitable coupling means may be used to mechanically couple the wand module 24 to the mounting arm 60.

In the embodiment illustrated in FIG. 9, the mounting arm 60 may further include fluid inlet 70, a fluid outlet 72, and a fluid passageway (not shown) extending therebetween and fluidly coupled with both the inlet 70 and outlet 72. In an embodiment, each of the inlet 70 and outlet 72 are disposed at or proximate the second end 64 of the mounting arm 60. The fluid inlet 70 is configured to be operatively and fluidly coupled to a fluid source, for example, a steam generator, a cleaning fluid source, etc. More particularly, the inlet 70 may have a fitting or coupling associated therewith, for example, a threaded portion 74, which is configured to be mated with a complementary fitting or coupling associated with one or more fluid sources to operatively couple the mounting arm 60 thereto. The outlet 72 may be configured to be operatively coupled to the inlet 38 of the wand module tubular member 30, and therefore, may include or comprise the coupling means described above with respect to the coupling of the wand module 24 with the mounting arm 60. When the wand module 24 is coupled with the mounting arm 60 such that the inlet 38 of the tubular member 30 and the outlet 72 of the mounting arm 60 are fluidly coupled together, and the inlet 70 of the mounting arm 60 is fluidly coupled to a fluid source, fluid (e.g., steam, cleaning fluid, etc.) may be communicated from the fluid source to the tubular member 30 through or via the inlet 70, fluid passageway, and outlet 72 of the mounting arm 60, and the inlet 38 of the tubular member 30.

In an embodiment, one or more valve(s) 75 may also be included so as to control the selective application or communication of fluid from one or more fluid sources to the wand module 24. In an embodiment, the valve 75 may be electrically connected to, and configured to be controlled by, the ECU 28 of frothing assembly 22 to thereby control the application or supply of fluid to the wand module during, for example, the performance of a frothing process and/or a cleaning process for the wand module 24. The valve(s) 75 may comprise any number of suitable electrically controlled valves, such as, for example and without limitation, a solenoid valve. Alternatively, the ECU 28 may be configured to directly control the operation of the fluid source(s) so as to control the application or supply of fluid to the wand module 24.

In general terms, the ECU 28 of the frothing assembly 22 is configured to exert a measure of control over one or more aspects of the operation of the frothing assembly 22, and/or to perform, or cause to be performed, some or all of the functionality of the frothing assembly 22 described herein. In embodiment, the ECU 28 may be dedicated ECU configured to control the operation of one or more components of the assembly 22, for example, the actuator 26, one or more fluid sources, and/or fluid valve(s), to cite a few possibilities (e.g., by issuing commands in the form of machine instructions to the component(s)). Alternatively, the ECU 28 may comprise the ECU of a larger system of which the frothing assembly 22 is a part (e.g., an ECU of the automated beverage generating system of which the frothing assembly 22 is a part (e.g., the ECU 14 of the kiosk 10)).

In any event, the ECU 28 may comprise one or more electronic processing units and one or more electronic memory devices. In another embodiment, rather than or in addition to the ECU 28 comprising a memory device, the frothing assembly 22 may include one or more memory devices that are separate and distinct from the ECU 28 (and the processing unit(s) thereof, in particular) but that is/are accessible thereby.

The processing unit of the ECU 28 may include any type of suitable electronic processor (e.g., a programmable microprocessor or microcontroller, an application specific integrated circuit (ASIC), etc.) that is configured to execute appropriate programming instructions for software, firmware, programs, algorithms, scripts, etc., to perform various functions, such as, for example and without limitation, one or more steps of the methodologies described herein.

The memory device, whether part of the ECU 28 or separate and distinct therefrom, may include any type of suitable electronic memory means and may store a variety of data and information. This includes, for example: software, firmware, programs, algorithms, scripts, and other electronic instructions that are required to perform or cause to be performed one or more of the functions described elsewhere herein (e.g., that are used (e.g., executed) by the ECU 28 to perform various functions described herein); various data structures (e.g., look-up tables); operating parameters and characteristics of the frothing assembly 22 and the constituent components thereof (e.g., one or more empirically-derived frothing profiles and/or operational profiles of one or more components of the frothing assembly 22, for example); etc. Alternatively, rather than all of the aforementioned information/data being stored in a single memory device, in an embodiment, multiple suitable memory devices may be provided.

In any event, the aforementioned instructions may be provided as a computer program product, or software, that may include a non-transitory, computer-readable storage medium. This storage medium may have instructions stored thereon, which may be used to program a computer system (or other electronic devices, for example, the ECU 28) to implement the control some or all of the functionality described herein, including one or more steps of the methodologies described below. A computer-readable storage medium may include any mechanism for storing information in a form (e.g., software, processing application) readable by a machine (e.g., a computer, processing unit, etc.). The computer-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical, or other types of medium suitable for storing program instructions. In addition, program instructions may be communicated using optical, acoustical, or other form of propagated signal (e.g., carrier waves, infrared signals, digital signals, or other types of signals or mediums.).

Figure 10:
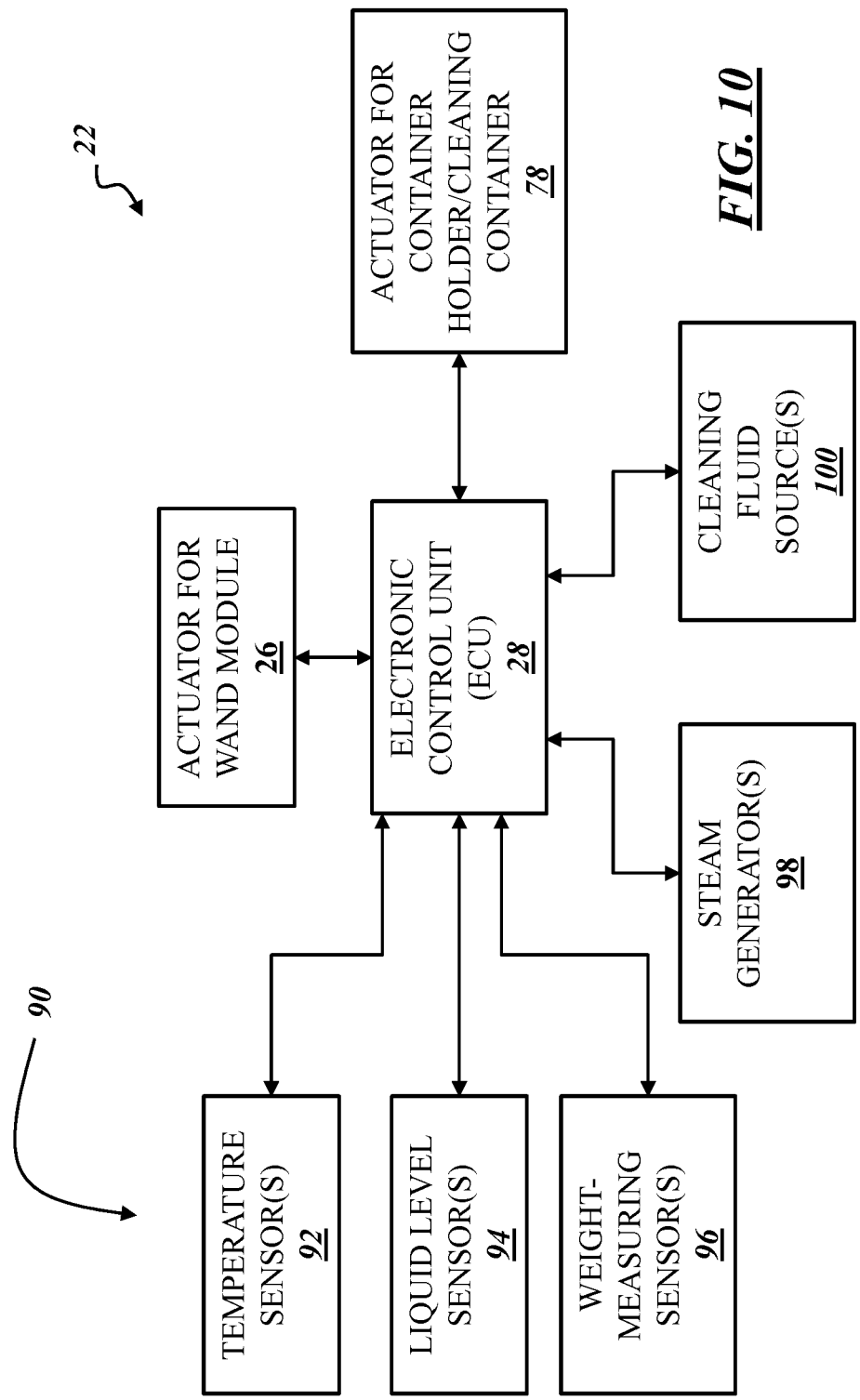
FIG. 10 is a schematic and diagrammatic view of the frothing assembly illustrated in FIGS. 2-5.

As illustrated in the block diagram of the frothing assembly 22 depicted in FIG. 10, the ECU 28 may be electronically connected to other components of the frothing assembly 22. These connections may be facilitated via I/O devices and suitable connections, such as, for example, a communications bus (e.g., a controller area network (CAN) bus), a networking cable (e.g., an Ethernet cable), or a wireless link, so that they may interact as required. It will be appreciated, however, that the present disclosure is not meant to be limited to any one type of electronic connection, but rather any connection that permits communication between the ECU 28 and other components of the frothing assembly 22 may be utilized.

As briefly mentioned above, the ECU 28 may be configured to perform, or cause to be performed, some or all of the functionality of the frothing assembly 22, including, for example, some or all of those functions and features described herein (e.g., one or more steps of the method(s) described below). For example, all valves, fluid sources, actuators, and/or other electrical, mechanical, or electromechanical components of the frothing assembly 22 described herein and otherwise may be controlled by the ECU 28. Accordingly, in an embodiment, the ECU 28 may be configured to receive a signal indicating that a frothing process is to be performed and to then effect the performance of that process by controlling (directly or indirectly) the operation of, for example, the actuator 26 to lower and raise the wand module 24 and activate and deactivate a steam generator, as required, in accordance with a particular, predetermined frothing profile.

To facilitate the interaction and communication between the ECU 28 and other components of the frothing assembly 22, the ECU 28 may comprise one or more network or communication interfaces that may include or be electronically connected to, and configured for communication with, other communication infrastructure (e.g., known components/devices such as, for example, routers, modems, antennas, electrical ports, transceivers, etc.) configured to facilitate and support one or more types of known communication networks or techniques/protocols including, for example, those described in U.S. Pat. No. 8,515,574, which was incorporated by reference above. In any event, network interface(s) may allow for the exchange of data/information between the ECU 28 and one or more other components of frothing assembly 22.

It will be appreciated by those having ordinary skill in the art that while the ECU 28 has been described thus far as a single component, in some embodiments, the functionality of the ECU 28 may be performed or caused to be performed by more than one ECU or other like component. For example, in an embodiment, the frothing assembly 22 may comprise a plurality of ECUs, each one of which is configured to perform or cause to be performed different functionality. For example, in an embodiment, a first ECU may be configured to control the operation of the actuator 26, while a second ECU may be configured to control the operation of one or more fluid sources. In such an embodiment, the various ECUs may be electronically connected to each other to allow for communication therebetween, and each may be configured to also communicate with other components of the frothing assembly 22 through, for example, dedicated or common network interfaces or other components thereof.

In an embodiment wherein the frothing assembly 22 is part of a larger beverage generating system, the ECU 28 may be configured to be electrically connected to, and for communication with, a main or master controller or ECU of the larger system. In such an embodiment, the ECU of the larger system may be configured to exert a measure of control over the operation of the ECU 28, and therefore, the frothing assembly 22.

While it will be apparent in view of the foregoing that any number of suitable control schemes or arrangements employing one or multiple ECUs or other suitable control/processing devices may be used to carry out the functionality of the frothing assembly 22 and the various components thereof, in particular, for purposes of illustration and clarity, the description below will be primarily with respect to an embodiment wherein the frothing assembly 22 includes a single ECU (i.e., the ECU 28) for controlling most, if not all, of the functionality of the frothing assembly 22 and the components thereof. It will be appreciated by those having ordinary skill in the art, however, that the present disclosure is not meant to be limited to such an embodiment, but rather any number of suitable control schemes and arrangements may be used and such other schemes and arrangements remain within the spirit and scope of the present disclosure.

In addition to the components described thus far, in various embodiments, the frothing assembly 22 may include any number of other components. With reference to FIG. 2, one such component is a container holder or platform 76 that is configured to receive a container (e.g., a cup) containing liquid (e.g., milk and/or other liquid ingredients for beverages, for example, chocolate, sweetener(s), and/or other flavoring(s)) that is to be frothed. In an embodiment, the container holder 76 may be fixed in place and oriented with the wand module 24, and the tubular member 30 thereof, in particular, to allow the tubular member 30 to be inserted into the container being carried by the container holder 76 during the frothing process (e.g., in the illustrated embodiment, the actuator 26 may lower the wand module 24 such that a portion of the tubular member 30 is inserted into the container carried by the container holder 76).

In another embodiment, however, the container holder 76 may be configured to be moved in one or more directions (e.g., along a horizontal axis) so as to move a container being carried thereby between two or more positions, wherein one of the positions results in the container holder 76 being oriented or aligned with the wand module 24 in the manner described above. In such an embodiment, the container holder 76 may be operatively coupled to an actuator 78, for example: a motor-driven or other electrically-actuated actuator; a pneumatic actuator; a hydraulic actuator; or any other suitable actuator, that is, in turn, configured to drive the movement of the container holder 76. In an embodiment, the actuator 78 comprises a pneumatic actuator that is fluidly coupled to an air source (not shown) that may be controlled by, for example, the ECU 28, to selectively apply air to the actuator 78 to thereby cause the actuator to move the container holder 76.

In the embodiment illustrated in, for example, FIGS. 2 and 5, the actuator 78 is operable to drive the movement of the container holder 76 along a longitudinal axis 80 that is normal or perpendicular (i.e., exactly normal or perpendicular or at least within operational tolerances to the axis 54 along which the actuator 26 moves the wand module 24. It will be appreciated, however, that in other embodiments, the container holder 76 may also or alternatively be moved axially relative to the axis 54, and therefore, the present disclosure is not limited to any particular movement of the container holder 76. In any event, the container holder 76 may be operatively coupled to the actuator 78 in a number of ways. As illustrated in FIGS. 2, 3, and 5, one such way is via a mounting bracket 82 associated with the container holder 76 or, for example, a base frame that carries the container holder 76. In an embodiment, the mounting bracket 82 may be configured to be coupled to the actuator 78 using, for example, one or more plurality of mechanical fasteners, for example, a plurality of screws.

In addition to performing frothing processes, the frothing assembly 22 may be further operable to perform a cleaning process on one or more components thereof, for example, the wand module 24. In such an embodiment, the frothing assembly 22 may further include a cleaning container 84 that is configured to be used during the cleaning process. In embodiment, the cleaning container 84 may include one or more jets 86 (shown in FIG. 5) located therein that is/are configured to spray a fluid, for example, water and/or other food-safe cleaning detergents or solvents onto one or both of the tubular member 30 and splash guard 32 of the wand module 24 when the tubular member and/or splash guard are inserted and appropriated positioned within the cleaning container 84 and the cleaning process is performed. As such, each jet 86 may be fluidly coupled to one or more fluid sources that are configured to supply the appropriate cleaning fluid (e.g., water of a certain temperature and/or one or more cleaning solvents or solutions) to the jets 86. In another embodiment, and as will be described more fully below, the cleaning container 84 may not include any jets, but rather the cleaning fluid may be supplied to and sprayed from the wand module 24 itself. In any event, the cleaning container 84 may also include a drain 88 to allow for the fluids used in the cleaning process to be evacuated or removed from the cleaning container 84 during and/or following the cleaning process. In yet another embodiment, the cleaning process may include the cleaning fluid supplied to and sprayed from the wand module 24 itself being directed into a cup or container that is placed on the container holder 76. The cleaning fluid(s) used in the cleaning process are then removed by removing the cup or container from the holder 76.

In addition to the above, in an embodiment, the cleaning container 84 (or alternatively a cup or other container placed on the container holder 76 that is used during the cleaning process) may further include one or more brushes or brush elements (not shown) extending into the interior of the cleaning container 84 from an interior surface thereof. For example, in an embodiment, one or more brush elements may extend radially-inwardly into the interior of the container 84 relative to the cleaning container centerline. Each brush element includes one or more bristles that is/are configured to contact and rub against or scrub one or both of the outer surface of the tubular member 30 and the inner surface of the splash guard 32 to further promote the cleaning of that or those components. In an embodiment, at least a portion of one or more of the brush element(s) may be integrally formed with the cleaning container 84; while in another embodiment, one or more of the brush elements may be mounted to an interior surface of the cleaning container 84 using, for example, one or more mechanical fasteners (e.g., screws, rivets, etc.).

In an embodiment wherein the cleaning container 84 (or alternatively a cup or other container placed on the container holder 76 that is used during the cleaning process) includes a plurality of brush elements, one or more brush elements may be laterally-spaced from one or more other brush elements along the interior surface of the cleaning container 84 (e.g., equally or unequally distributed, disposed on diametrically opposed sides of the container 84, etc.). Additionally, or alternatively, one or more brush elements may be axially-spaced from one or more other brush elements relative to the cleaning container centerline. Whether the container 84 includes one or multiple brush elements, each brush element may extend in a direction that is either parallel to the centerline of the container 84 (e.g., in an instance wherein one or more brush elements extend from an interior surface at the bottom of the container 84, or transverse to the cleaning container centerline (e.g., in an instance wherein one or more brush elements extend radially-inwardly from an interior surface of a sidewall of the container 84). In the latter instance, each brush element may extend at a 90° angle relative to the centerline, or alternatively, at an angle that is less than or greater than 90°. In one embodiment, all of the brush elements may extend at the same angle; in another embodiment, one or more of the brush elements may extend at a different angle than one or more other brush elements. Accordingly, it will be appreciated in view of the foregoing that the present disclosure is not intended to be limited to any particular spatial distribution or arrangement, and/or brush element orientation relative to the centerline of the container 84; rather, any suitable arrangement and/or orientation may be used.

As with the container holder 76 described above, in an embodiment, the cleaning container 84 may be fixed in place and oriented with the wand module 24, and the tubular member 30 thereof, in particular, to allow the tubular member 30 to be inserted into the cleaning container 84 during a cleaning process being performed thereon (e.g., the actuator 26 may lower the wand module 24 such that at least a portion of the tubular member 30 is inserted into the cleaning container 84). In another embodiment, however, the cleaning container 84 may be configured to be moved in one or more directions (e.g., along a horizontal axis) so as to move the cleaning container 84 between two or more positions, wherein one of the positions results in the cleaning container 84 being oriented or aligned in the manner described above. In such an embodiment, the cleaning container 84 may be operatively coupled to an actuator, for example: a motor-driven or other electrically-actuated actuator; a pneumatic actuator; a hydraulic actuator, or any other suitable actuator, that is, in turn configured to drive the movement of the cleaning container 84.

In the embodiment illustrated in FIGS. 2, 3, and 5, the cleaning container 84 and the container holder 76 are operatively coupled to the same actuator, actuator 78, and actuator 78 is operable to drive the movement of both the container holder 76 and the cleaning container 84 along the longitudinal axis 80. More particularly, the actuator 78 is operable to move between a first position wherein the cleaning container 84 is aligned with the wand module 24, and a second position wherein the container holder 76 is aligned with the wand module 24. In such an embodiment, the container holder 76 and the cleaning container 84 may be carried by a common base frame that is, in turn, coupled to and configured to be driven by the actuator 78. The base frame may be operatively coupled to the actuator 78 in a number of ways, including, but not limited to, by a mounting bracket, such as, for example, the mounting bracket 82 described above.

In another embodiment, rather than the container holder 76 and the cleaning container 84 being configured to be operatively coupled to, and driven by, the same actuator, separate actuators may be used to drive the movement of the cleaning container 84 and the container holder 76, respectively. Further, and as with the container holder 76 described above, in addition to or instead of the cleaning container 84 being moved along the longitudinal axis 80, it may also or alternatively be moved axially relative to the longitudinal axis 54 along which the actuator 26 moves the wand module 24, and/or in any number of other directions. Accordingly, the present disclosure is not limited to any particular movement of the cleaning container 84.

As described above, the ECU 28 may be configured to exert a measure of control over the operation of the frothing assembly 22. To facilitate this control, the frothing assembly 22 may include one or more sensors 90 that are configured to sense or measure one or more characteristics related to the liquid that is to be frothed, or that is being frothed, by the frothing assembly. As best shown in FIG. 10, these sensors 90 may include, for example, and without limitation: one or more temperature sensors 92 to sense or measure the temperature of the liquid prior to, during, or after the performance of a frothing process; one or more liquid level sensors 94 (e.g., ultrasound sensors, optical sensors, IR sensors, or any other suitable sensing device) to sense or measure the level of the liquid in the cup prior to, during, or after the performance of a frothing process; and/or one or weight-measuring sensors 96 (e.g., a load cell integrated into the container holder 76) to sense or measure the weight of the liquid prior to, during, or after the performance of the frothing process, to cite a few possibilities. In an embodiment, one or more of the sensors 90 may be integrated into another component of the frothing assembly (e.g., the wand module 24, container holder 76, etc.), while in other embodiments, one or more of the sensors 90 may be separate and distinct components of the assembly 22. In any event, the sensors 90 are configured to be to electrically connected (e.g., over one or more wires or wirelessly) to the ECU 28, which may receive electrical signals from the sensors 90 representative of the characteristic(s) sensed or measured thereby. The ECU 28 may then use the information represented by the received electrical signals to control one or more aspects of the frothing assembly 22, as will be described in greater detail below.

As was at least alluded to above, the frothing assembly 22 may further include one or more fluid sources that may be used for various purposes. For example, steam is required to perform a frothing process; as such, the frothing assembly 22 may include one or more steam generators 98 (best shown in FIG. 10) for generating and supplying steam to the wand module 24 during a frothing process. In an embodiment, the operation of the steam generator 98 may be controlled directly or indirectly by the ECU 28 to selectively supply steam to the wand module 24. In an embodiment, the steam generator 98 may be configured to vary the pressure, temperature, and/or water content (e.g., wet and dry) of the steam. As described above, in an embodiment, the steam generator 98 is fluidly coupled to the wand module 24, and the tubular member 30 thereof, in particular, to allow steam to be communicated to the wand module 24 and ultimately introduced or injected into the liquid being frothed.

The frothing assembly 22 may also include one or more cleaning fluid sources 100 (best shown in FIG. 10). In an embodiment, the cleaning fluid source(s) 100 is/are configured to supply cleaning fluid, for example, hot water and/or one or more cleaning detergents or solvents, which may be used to clean one or more components of the assembly 22, for example, the wand module 24, during a cleaning process. As with the steam generator 98, in an embodiment, the operation of the cleaning fluid source(s) 100 may be controlled directly or indirectly by the ECU 28 to selectively provide one or more cleaning fluids to either the cleaning container 84 and/or the wand module 24, as appropriate, during the performance of a cleaning process. In an embodiment, the cleaning fluid source(s) 100 may be configured to vary the temperature of the fluid and/or the type(s) of fluid, depending on, for example, whether the cleaning process is only a cleaning process or a cleaning and sterilizing process.

In an embodiment such as that illustrated in FIGS. 2-5, the frothing assembly 22 may further include a base or mounting frame 102 to which one or more components of the assembly 22 are operatively coupled and mounted. For example, in an embodiment, the actuators 26, 28 and the ECU 28 are each operatively coupled/mounted to or carried by the front side of the base frame 102 by, for example, one or more mechanical fasteners. As shown in FIGS. 2, 4, and 5, the back side of the base frame 102 includes, for example, one or more mounting brackets 104 to facilitate the integration of the frothing assembly 22 into, for example, a beverage generating system (e.g., kiosk), as well as one or more power supplies 106 (e.g., a 24V supply) for supplying power to various components of the assembly 22, and electrical interconnects 108 to facilitate the electrical connection of various components of the frothing assembly 22 (e.g., the ECU 28, sensors 90, etc.) and the integration of the assembly 22 into a larger system.

While certain components of illustrative embodiments of the frothing assembly/module 22 and a larger automated beverage generating system or kiosk 10 have been specifically identified and described above, it will be appreciated that in other embodiments, the frothing assembly 22 and/or kiosk 10 may include additional components or, conversely, may include less than all of the components specifically identified above. Accordingly, the present disclosure is not meant to be limited to any particular arrangement of the frothing assembly 22 or kiosk 10.

Figure 11:
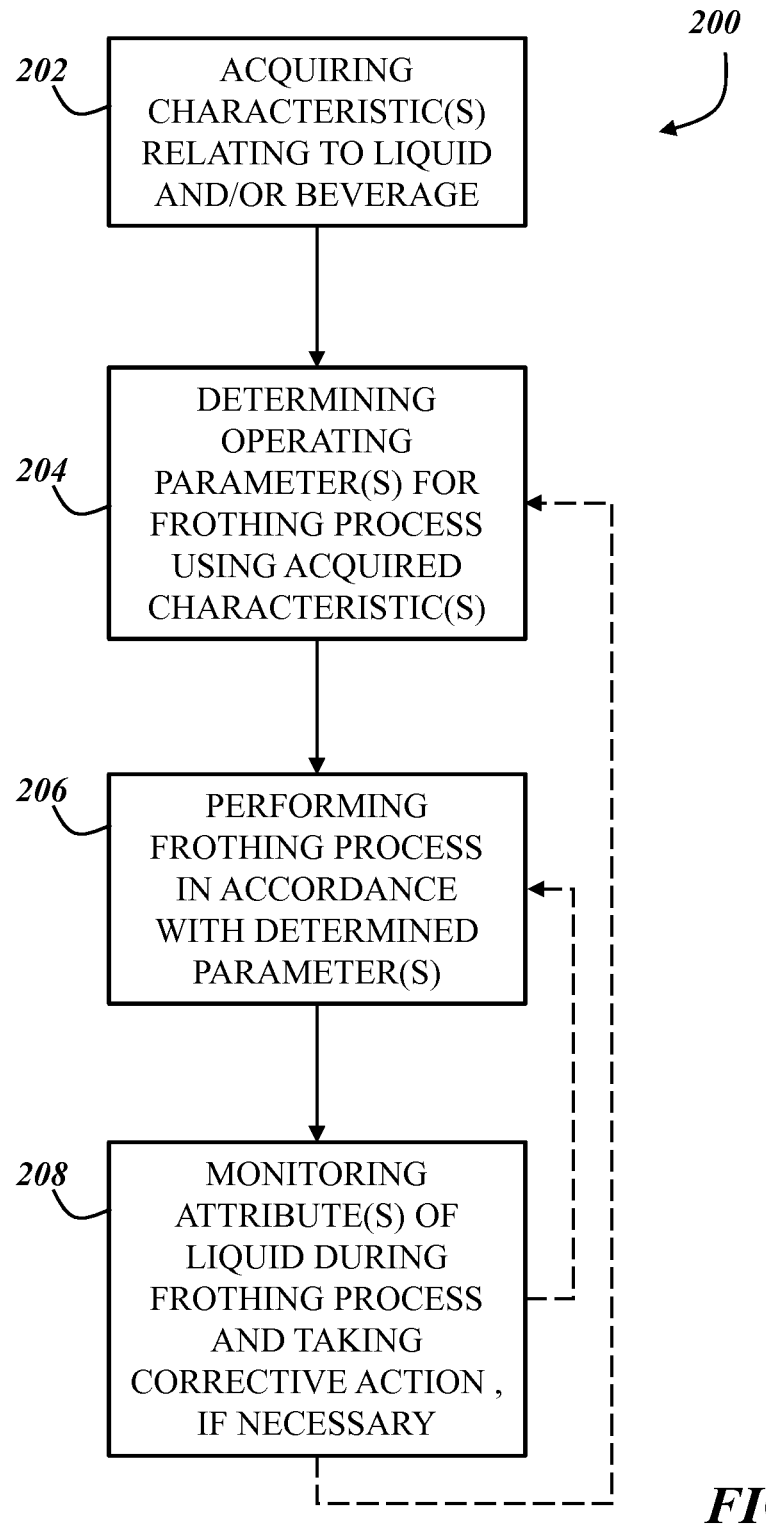
FIG. 11 is a flow diagram of an illustrative embodiment of a method of operating a frothing assembly, and more particularly, a method for determining one or more operating parameters of a frothing process to be performed by the frothing assembly.

Referring now to FIG. 11, there is shown a method 200 of operating a frothing module or assembly, and more particularly, a method for determining one or more operating parameters of a frothing process to be performed on a particular liquid (e.g., a liquid comprising one or a combination of ingredients or components) by the frothing assembly. For purposes of illustration and clarity, method 200 will be described in the context of the frothing assembly 22 described above. It will be appreciated, however, that the application of the present methodology is not meant to be limited solely to such an implementation, but rather method 200 may find application with any number of other types or implementations of frothing modules/assemblies. Additionally, it should be noted that while the steps of method 200 will be described as being performed or carried out by one or more particular components of the frothing assembly 22 (e.g., the ECU 28), in other embodiments, some or all of the steps may be performed by components of the frothing assembly 22, or constituent sub-components thereof, other than that or those described, or components not part of the frothing assembly 22 but configured for use therewith (e.g., a main controller or ECU of a beverage generating system of which the frothing assembly 22 is a part, for example). Accordingly, it will be appreciated that the present disclosure is not limited to an embodiment wherein particular components described herein are configured to perform the various steps.

In an embodiment, method 200 includes a step 202 of determining or acquiring one or more characteristics (or values corresponding thereto, if appropriate) relating to the liquid to be frothed by the frothing assembly 22 and/or the beverage of which the liquid is a component.

Characteristics relating to the liquid may include, for example, those relating to the liquid itself and/or those relating to the particular container in which the liquid will be disposed during the frothing process. The characteristics relating to the liquid itself may include, for example and without limitation, one or more of: the overall fat content of the liquid; the individual fat contents of one or more of the ingredients or components that make up the liquid (e.g., the fat content of milk (e.g., dairy, soy, etc.), flavorings, and/or other additives); the overall volume of the liquid; the individual volumes or amounts of one or more of the ingredients/components of the liquid; the overall weight of the liquid; the individual weights of one or more of the ingredients/components of the liquid; the temperature of the liquid; and the particular type(s) of the ingredient(s)/component(s) that that make up the liquid, to cite a few possibilities. In an embodiment, the characteristics relating to the container in which the liquid is or will be disposed may include, for example, and without limitation, one or more of: the capacity or size of the container (e.g., the fl. oz.); and the distance between a point at the top or bottom of the container and the surface of the liquid (i.e., the level of the liquid in the container relative to the top and/or bottom of the container), to cite a few possibilities.

Characteristics relating to the beverage may include, for example and without limitation: the type of beverage (e.g., latte, cappuccino, etc.); the desired amount of foam for the beverage; the temperature at which the beverage is to be served to the customer; and/or the desired type of frothing or stretching process (e.g., wet or dry) that is required for that particular beverage.

In an embodiment, step 202 may comprise determining one or more characteristics from only one of the above described categories; while in other embodiments, step 202 may comprise determining one or more characteristics from two or more of the categories described above. Accordingly, the present disclosure is not limited to the use of any particular characteristic(s), type(s) of characteristic(s), or number of characteristics In any event, how characteristic is determined is at least partially dependent on the particular characteristic. For example, for certain characteristics, the ECU 28 of the frothing assembly 22 may receive electrical signals representative of the characteristic from one or more sensor(s) 90 of the frothing assembly 22. For example, in an embodiment wherein the temperature of the liquid prior to the frothing process is a characteristic of interest, the temperature sensor(s) 92 may measure or sense the temperature of the liquid, and one or more electrical signals representative of the sensed or measured temperature may be received by the ECU 28 from the sensor(s) 92. The ECU 28 may then interpret or process the received signal(s) to determine the temperature of the liquid. Similarly, in an embodiment wherein the liquid level is a characteristic of interest, the liquid sensor(s) 94 may measure or sense the level of liquid in the container and one or more electrical signals representative of the sensed or measured liquid level may be received by the ECU 28 from the sensor(s) 94. Again, the ECU 28 may then interpret or process the received signal(s) to determine the level of the liquid. It will be appreciated that while only a select few characteristics were specifically identified/described above, other characteristic(s) (e.g., the weight of the liquid) may also be determined in the same or similar manner.

For the same or other characteristics, the ECU 28 may receive one or more electrical signals representative of the characteristic from a component of a larger system of which the frothing assembly 22 is a part. For example, in an embodiment wherein the frothing assembly 22 is component of a larger beverage generating system (e.g., the kiosk 10), the ECU 22 may receive one or more electrical signals representative of one or more characteristics from an electronic control (e.g., a main or master controller or ECU (e.g., the ECU 14 of the kiosk 10)) of the beverage generating system, a sensor of the system, or some other component. In such an embodiment, the ECU 28 may interpret or process the received signal(s) to determine the characteristic. For instance, in an embodiment wherein the overall fat content of the liquid and/or the fat contents of the individual ingredients/components of the liquid are of interest, an ECU of the beverage generating system may send one or more electrical signals representative of the fat content(s) to the ECU 28, which may then interpret or process the electrical signal(s) to determine the fat content(s) of interest. Similarly, in an embodiment wherein the overall volume of the liquid and/or the volumes of the individual ingredients/components of the liquid are of interest, an ECU of the beverage generating system may send one or more electrical signals representative of the volume(s) to the ECU 28, which may then interpret or process the electrical signal(s) to determine the volume(s) of interest. In any event, in an embodiment, the ECU 28 may send a request for the information of interest to the appropriate component of the beverage generating system or, alternatively, the information may be automatically sent to the ECU 28 when, for example, the container containing the liquid to be frothed is delivered to the frothing assembly 22. It will be appreciated that while only a select few characteristics were specifically identified/described above, other characteristic(s) (e.g., the size/capacity of the container in which the liquid is disposed, the type(s) of ingredient(s)/component(s) making up the liquid, the type of beverage, the type of stretching/frothing process, etc.) may also be determined in the same or similar manner.

Another way that characteristic of interest may be determined or acquired is by acquiring it from a data structure, for example, one or more look-up tables, stored in or on a memory device of, or accessible by, the ECU 28. More particularly, in an embodiment, the ECU 28 may receive information relating to the liquid from a component of a larger system of which the frothing assembly 22 is a part, and may use that information to look up one or more characteristics of interest in a corresponding look-up table that correlates the received information with the one or more characteristics. For example, in an embodiment wherein the frothing assembly 22 is a component of a larger beverage generating system, the ECU 28 may receive one or more electrical signals representative of information relating to, for example, the liquid that is to be frothed (e.g., the type and/or quantity of the liquid and/or its component parts), the size or capacity of the container in which the liquid is or will be disposed during the frothing process, the type of beverage that the liquid is a component of, and/or the type of frothing process that is required, to cite a few possibilities. The ECU 28 may use some or all of this information (input) with an appropriately configured look-up table to determine a characteristic of interest (output).

By way of illustration, in one example, the ECU 28 may receive the weight of the liquid that is to be frothed and the size of the container in which the liquid is disposed. Using this information and a multi-dimensional look-up table that correlates liquid weight and container size with volume, the volume of the liquid may be determined by looking up the received weight and container size in the table and acquiring the corresponding volume. In another example, the ECU 28 may receive the particular type of liquid that is to be frothed and the amount of that liquid. Using this information and a look-up table that correlates liquid type and amount with fat content, the fat content of the liquid may be determined by looking up the received liquid type and amount in the table and acquiring the corresponding fat content.

It will be appreciated that while only a few specific characteristics were specifically identified/described above, other characteristic(s) may also be determined in the same or similar manner.

Yet another way that a characteristic of interest may be determined is by calculating a value for the characteristic using other characteristics and/or information. More particularly, in an embodiment, the ECU 28 may receive information relating to the liquid from a component of a larger system of which the frothing assembly 22 is a part, and may use that information to calculate a value of a characteristic of interest. For example, in an embodiment wherein the frothing assembly 22 is a component of a beverage generating system, and the overall fat content of the liquid is a characteristic of interest, the ECU 28 may receive one or more electrical signals representative of the individual fat contents of the ingredients making up the liquid. Using this information, the ECU 28 may be configured to execute an appropriate equation or algorithm to calculate an overall fat content for the liquid. It will be appreciated that while only one particular characteristic was specifically identified/described above, other characteristic(s) may also be determined in the same or similar manner.

In view of the foregoing, it will be appreciated that any number of techniques, including techniques not explicitly described herein, may be used to determine or acquire one or more characteristics of interest relating to the liquid to be frothed by the frothing assembly 22, or the beverage of which the liquid is a component. Accordingly, it will be further appreciated that the present disclosure is not limited to any particular technique(s).

Following the determination or acquisition of one or more characteristics of interest (or values thereof, if appropriate) in step 202, method 200 further comprises a step 204 of using that or those characteristics to determine one or more operating parameters that may used to perform a particular frothing process. In an embodiment, the same or different acquired characteristic(s) may be used to determine different individual operating parameters; while in another embodiment, one or more of the acquired characteristics may be used to determine or select a predetermined, empirically-derived frothing profile containing a plurality of specific operating parameters. Any number of frothing process operating parameters may be determined in this step.

One possible parameter is a start point or position for the wand module 24, and at least a portion of the tubular member 30 thereof, in particular, at which the frothing process is to start or begin. In an embodiment, the start position may be a position relative to the surface of the liquid that is to be frothed. More particularly, in an embodiment, the start position is a point below the surface of the liquid to which the actuator 26 moves the tubular member 30 before fluid (e.g., steam) is injected or introduced into the liquid via the wand module 24.

In an embodiment, the start position may correspond to a point that is a particular depth below the surface of the liquid such that when it is reached by the tubular member 30, one or more—but not all—of the outlets 40 of the tubular member 30 are submerged in the liquid (e.g., the outlets $40_1$, $40_2$ of tubular member 30 illustrated in FIGS. 8a and 8b). More particularly, in at least certain instances, orienting the tubular member 30 in this manner allows certain of the outlets 40 (e.g., the outlets $40_1$, $40_2$ in the embodiment of the tubular member 30 illustrated in FIGS. 8a and 8b) to inject air into the liquid, while other outlets 40 (e.g., the outlets $40_3$, $40_4$ of tubular member 30 illustrated in FIGS. 8c and 8d) provide the force to create a vortex in the container. In another embodiment, however, the start position may correspond to a point that is a particular depth below the surface of the liquid such that when it is reached by the tubular member 30, all of the outlets 40 of the tubular member 30 are submerged in the liquid. As such, it should be noted that the start position parameter may not always be the same for every frothing process performed by the frothing assembly 22. Accordingly, for a given frothing process, the starting point may correspond to a greater (deeper) or lesser (shallower) depth relative to the surface of liquid than it would be for another frothing process.

Another possible parameter is an end point or position for the wand module 24, and at least a portion of the tubular member 30 thereof, in particular, relative to the surface of the liquid that corresponds to the deepest point the tubular member 30 will reach during the frothing process. More particularly, in an embodiment, the end position is the deepest point below the surface of the liquid that the actuator 26 moves the tubular member 30 to during the frothing process. As with the start position parameter described above, it should be noted that the end position parameter may not be the same for every frothing process performed by the frothing assembly 22. Accordingly, for a given frothing process, the end position may be at a greater (deeper) or lesser (shallower) depth relative to the surface of the liquid than it would be for another frothing process.

Yet another parameter is a steam cut-off point or position for the wand module 24, and at least a portion of the tubular member 30 thereof, in particular, relative to the surface of the liquid. The steam cut-off position corresponds to a point or position within the liquid at which steam or other fluid being applied to the liquid is cut-off or no longer applied (e.g., the steam generator stops supplying steam to the wand module). It will be appreciated that after the tubular member reaches this particular position and steam is no longer applied, positive pressure may nonetheless be maintained in the tubular member 30 to prevent the liquid in the container from flowing through the outlets 40 and into the interior fluid passageway 42 of the tubular member 30. As with the start and end position parameters described above, it should be noted that the steam cut-off position parameter may not be the same for every frothing process performed by the frothing assembly 22. Accordingly, for a given frothing process, the cut-off position may be at a greater (deeper) or lesser (shallower) depth relative to the surface of the liquid than it would be for another frothing process.

An additional frothing parameter is the rate(s) at which the tubular member is inserted into the liquid (e.g., moved from the start position to the end position) and/or retracted or removed from the liquid (e.g., moved from the end position to a point above the surface of the liquid or another point, for example, the start position or the steam cut-off position). As with the other parameters described above, it should be noted that the insertion and/or extraction rates may not be the same for every frothing process performed by the frothing assembly 22. Accordingly, different frothing processes may include different insertion and/or retraction rates.

It will be appreciated that while certain frothing parameters were described with particularity above, the present disclosure is not intended to be limited to any particular operating parameter(s); rather, one of ordinary skill in the art would appreciate that parameters other than those described above may also or alternatively be used (e.g., heating time, temperature at which to maintain the liquid during the process, etc.). It will be further appreciated that in an embodiment wherein step 204 comprises determining a frothing profile, the present disclosure is not intended to be limited to a frothing profile containing a particular number of parameters; rather, one of ordinary skill will appreciate that a frothing profile may include any number of parameters.

Whether an individual operating parameter or a frothing profile containing a plurality of parameters is determined in step 204, the determination may be made in any number of ways. One way is by acquiring or selecting the particular parameter or profile from a data structure, for example, one or more look-up tables containing a plurality of predetermined, empirically-derived operating parameters or frothing profiles, stored in or on a memory device of or accessible by the ECU 28. More particularly, in an embodiment, the ECU 28 may use one or more of the characteristics acquired in step 202 to look up a corresponding operating parameter or frothing profile in a look-up table that correlates the one or more of the characteristics acquired in step 202 with the corresponding operating parameter or profile. Accordingly, step 204 may comprise translating or mapping the acquired characteristic(s) to one particular operating parameter or profile from a plurality of parameters or profiles. In an embodiment wherein individual operating parameters are determined, step 204 may be repeated for each operating parameter until all of the necessary parameters have been determined.

In other embodiments, step 204 may be performed in different way than that described above. For example, using one or more of the characteristics acquired in step 202, the ECU 28 may be configured to execute one or more equations or algorithms to determine or more operating parameters. Accordingly, it will be appreciated that the present disclosure is not intend to be limited to any particular way(s) of performing step 204.

In any event, once the relevant operating parameter(s) or frothing profile is determined in step 204, method 200 may further include a step 206 of performing or executing the frothing process in accordance with determined parameter(s) or profile. By way of example and illustration only, assume that a frothing profile was determined in step 204 and that profile includes a particular start position, a particular end position, and a particular insertion/retraction rate for the wand module 24 of the frothing assembly 22. When the ECU 28 determines that a container containing the liquid to be frothed has been received by the container holder 76, and the container holder 76 has been oriented with the wand module 24 to allow the tubular member 30 thereof to be inserted into the container (which may involve the ECU 28 controlling the actuator 78 to properly orient the container holder 76), the ECU 28 may control the actuator 26 to move the tubular member 30 to the appropriate start position. In an embodiment, the ECU 28 may know precisely how far to move the wand module 24 to reach the start position by knowing the level of the liquid within the container and the size of the container. For example, if the ECU 28 knows the volume of the liquid and the container size, it can determine the liquid level, and therefore, the relative distance to the surface of the liquid. Alternatively, a liquid level sensor, such as that described above, may be used. In any event, by knowing the distance to the liquid surface and the required starting position, which corresponds to a point a particular known distance below surface of the liquid, the ECU 28 can control the actuator 26 to precisely move (e.g., lower) the wand module 24 to the start position.

Once the wand module 24 reaches the start position, the ECU 28 may activate, or cause to be activated, the steam generator. The ECU 28 may then control the actuator 26 to move (e.g., lower) the wand module 24 to the end position, and to do so in accordance with the prescribed insertion rate. Once it determines that it is time to retract the wand module 24, the ECU 28 may control the actuator 26 to retract (e.g., raise) the wand module 24 at the prescribed extraction rate until the wand module 24 has been removed from the liquid.

In addition to the steps described above, in an embodiment, method 200 may further include a step 208 of monitoring one or more attributes of the liquid during the performance of a frothing process to ensure that the assembly 22 or one or more particular components thereof are operating in a desired or optimal manner. Step 208 may be performed continuously or in accordance with a predetermined sampling rate. Any number of parameters may be monitored, and the monitoring may take any number of forms. As a result of the monitoring, the specific actions described above in step 206 may be altered in order to dynamically change the frothing process being performed. Alternatively, the frothing process can be reassessed by repeating steps 204 and 206 throughout the frothing process (as shown by the dotted lines in FIG. 11).

For example, in an embodiment, the ECU 28 is configured to monitor the temperature of the liquid during the frothing process to ensure that a particular user-defined or system-defined temperature is being maintained throughout the frothing process. In an embodiment, the temperature sensor(s) 92 may measure or sense the temperature of the liquid and one or more electrical signals representative of the sensed or measured temperature may be received by the ECU 28. The ECU 28 may interpret or process the received signal(s) to determine the temperature of the liquid, and compare that temperature to a predetermined threshold temperature or temperature range to determine whether the liquid is at the appropriate temperature. In an embodiment, if it is determined that the temperature is unacceptably above or below the temperature or temperature range to which it was compared, the ECU 28 may take corrective action to bring the temperature of the liquid back to the required temperature or within the required temperature range. More particularly, the ECU 28 may adjust, or cause to be adjusted, one or more operational parameters of the assembly 22, for example, the depth of the tubular member 30, the rate at which the tubular member 30 is inserted or refracted, and/or the magnitude of the steam pressure, to cite a few possibilities. For example, in an instance wherein the temperature is below the threshold temperature by an unacceptable amount (e.g., either below it or below it by at least a predetermined amount), the ECU 28 may cause the actuator 26 to move the tubular member 30 deeper into the liquid and/or to adjust the volume of the steam being applied to the liquid until the temperature rises.

In another example, the ECU 28 may be configured to monitor the weight of the liquid during the frothing process to ensure that the weight is changing in accordance with a predetermined rate. In an embodiment, the weight-measuring sensor (e.g., load cell) 96 integrated into the container holder 76 may measure or sense the weight of the liquid, and one or more electrical signals representative of the sensed or measured weight may be received by the ECU 28. The ECU 28 may then interpret or process the received signal(s) to determine the weight of the liquid and the rate at which it is changing, and compare, for example, the rate of change to a predetermined threshold rate to determine whether the weight of the liquid is changing appropriately. In an embodiment, if it is determined that the rate of change is unacceptably above or below the threshold rate to which it was compared, the ECU 28 may take corrective action. For example, in an instance wherein the weight of the liquid is changing too rapidly, this may indicate that there is too much water in the steam, and the ECU 28 may adjust, or cause to be adjusted, the water content in the steam being supplied by the steam generator.

While in the examples above, the ECU 28 takes corrective action to ensure that one or more components are operating in an acceptable and/or optimal manner, in certain instances, the ECU 28 may be further configured to determine that such corrective action will not be sufficient or will only be a temporary fix, and may be further configured to cause one or more components (e.g., the steam generator) to be taken "offline" until the component(s) can be serviced and/or self-correct. Alternatively, the ECU 28 may be configured to send a flag to a component of a larger system of which the frothing assembly 22 is a part, which may then take some form of action.

It will be appreciated that any number of attributes in addition to or instead of those described above may be monitored. For example, the height of the foam in the container may be monitored and if it is too high, the wand module 24 may be retracted or the steam generator may be adjusted to supply less steam. Therefore, the present disclosure is not limited to the monitoring of any particular attribute(s).

Figure 12:
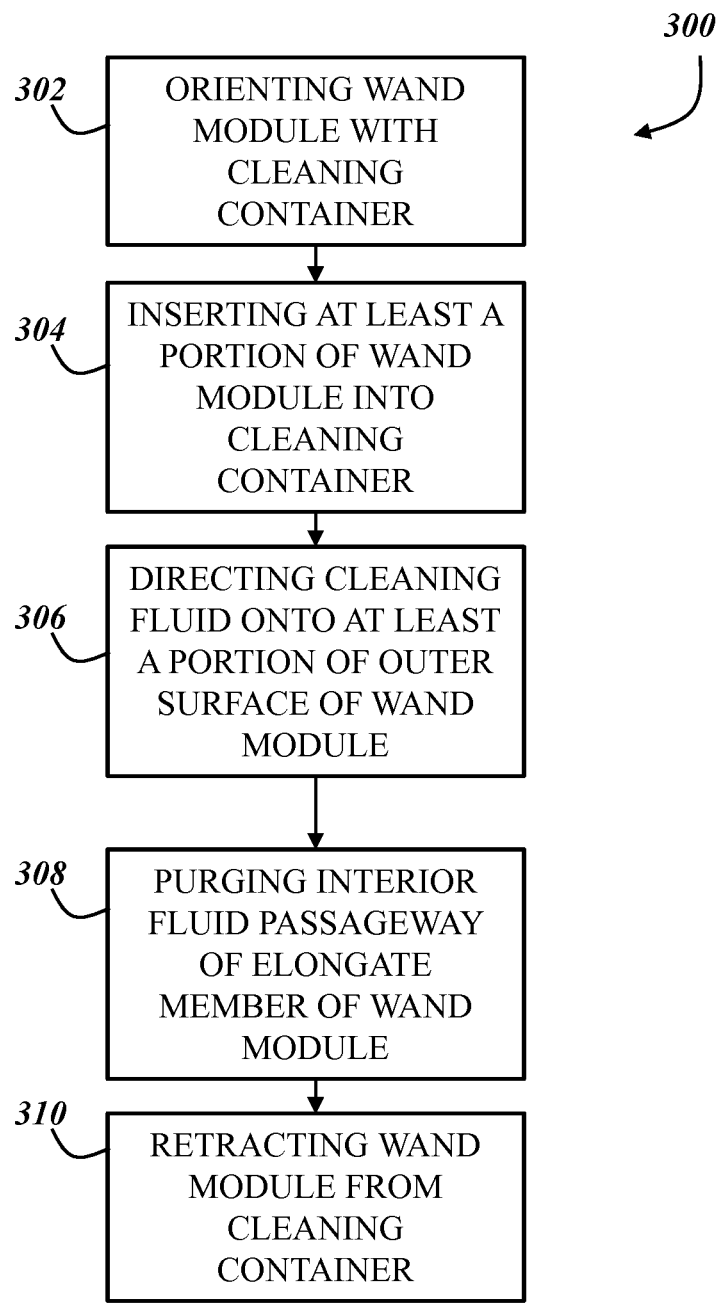
FIG. 12 is a flow diagram of an illustrative embodiment of a method of operating a frothing assembly, and more particularly, a method for performing a cleaning or cleaning and sterilizing process on one or more components of the frothing assembly.

With reference to FIG. 12 there is shown a method 300 of operating a frothing module or assembly, and more particularly, a method for performing a cleaning or cleaning and sterilizing process on one or more components of the frothing assembly. As with method 200, for purposes of illustration and clarity, method 300 will be described in the context of the frothing assembly 22 described above. It will be appreciated, however, that the application of the present methodology is not meant to be limited solely to such an implementation, but rather method 300 may find application with any number of other types or implementations of frothing modules/assemblies. Additionally, it should be noted that while the steps of method 300 will be described as being performed or carried out by one or more particular components of the frothing assembly 22 (e.g., the ECU 28), in other embodiments, some or all of the steps may be performed by components of the frothing assembly 22, or constituent sub-components thereof, other than that or those described, or components not part of the frothing assembly 22 but configured for use therewith (e.g., a main controller or ECU of a beverage generating system of which the frothing assembly 22 is a part, for example (e.g., the ECU 14 of the kiosk 10)). Accordingly, it will be appreciated that the present disclosure is not limited to an embodiment wherein particular components described herein are configured to perform the various steps.

In an embodiment, method 300 includes a step 302 of orienting the wand module 24 of the frothing assembly 24 with the cleaning container 84 such that the wand module 24, or at least a particular portion thereof, may be inserted into the cleaning container 84. This may comprise, for example, the ECU 28 causing the actuator 78 to drive the movement of the cleaning container 84 into the correct orientation and/or causing the actuator 26 to move the wand module 24 into the correct orientation. In certain embodiments, this step may be optional.

Method 300 may further include a step 304 of inserting the wand module 24 into the cleaning container 84. The cleaning container 84 is sized and shaped to receive at least a portion of the tubular member 30 of the wand module 24, and, in an embodiment, at least a portion of the splash guard 32. Step 304 may comprise the actuator 26, under the control of the ECU 28, causing the wand module 24 to be inserted (e.g., lowered) into the cleaning container 84.

Once the wand module 24 has been inserted into the cleaning container 84, method 300 may further comprise a step 306 of directing cleaning fluid onto one or both of the outer surface of the tubular member 30 and the inner and/or outer surface of the splash guard 32. The cleaning fluid may comprise, for example, one or a combination of hot water (e.g., 150-170° F.), one or more cleaning solvents, detergents, or agents, and/or any other fluid suitable to breakdown, for example, fat accumulated on the surface(s) being cleaned and to wash away remnants of the frothed fluid on the wand module 24. Additionally, depending on whether just a cleaning or a cleaning and sterilization process is being performed, different cleaning fluid(s) may be utilized. In any event, step 306 may take a number of forms.

In an embodiment, step 306 comprises spraying the cleaning fluid onto the tubular member 30 and/or splash guard 32 using one or more jets 86 disposed within the cleaning container 84 that are in fluid communication with one or more cleaning fluid sources 100. In such an embodiment, the jets 86 may be selectively activated by, for example, the ECU 28. In such an embodiment, a positive pressure may be maintained in the tubular member 30 to prevent, or at least substantially limit, cleaning fluid from flowing through the outlets 40 and into the interior fluid passageway 42 of the tubular member 30. This positive pressure may be applied by, for example, the steam generator 98 under the control of the ECU 28.

In another embodiment, step 306 may alternatively or additionally comprise causing the cleaning fluid to be passed through the inlet 38, fluid passageway 42, and outlets 40 of the tubular member 30. In such an embodiment, the inlet 38 of the tubular member 30 is in fluid communication with the cleaning fluid source(s) 100, which may be selectively activated by, for example, the ECU 28. After the cleaning fluid exits the tubular member 30 via the outlets 40, it ricochets or reflects off the interior surface of the cleaning container 84 and is directed back onto the outer surface of the tubular member 30 and/or the inner and/or surface of the splash guard 32, thereby cleaning or cleaning and sterilizing the want module 24. In order to achieve the action of the cleaning described above, the cleaning fluid must be supplied to the tubular member 30 at a sufficient pressure. In an embodiment, this pressure may be approximately 5 psi; though, in other embodiments, a suitable pressure that is less than or greater than 5 psi may be utilized. Additionally or alternatively, the wand module 24 and the inner surface of the cleaning container 84 must be sufficiently close to each other to allow cleaning fluid to be directed back onto the tubular member 30 and/or splash guard 32. In yet another embodiment, a cup or container placed on the container holder 76 may be used for the cleaning process in place of the cleaning container 84.

Regardless of the particular form step 306 takes, method 300 may comprise an optional step 308 of purging the tubular member 30 of the wand module 24. This may comprise, for example, introducing a fluid (e.g., water, air, a gas, etc.) into the fluid passageway 42 of the tubular member 30 to, among potentially other things, expel fluid (e.g., cleaning fluid, liquid from the frothing process, condensation, etc.) from the interior of the tubular member 30. In an embodiment, the ECU 28 is configured to activate a fluid source (e.g., steam generator 98, cleaning fluid source 100, or otherwise) to purge the tubular member 30 in this manner. It should be noted, that this step may also or alternatively be included as a step frothing methodology (e.g., at the beginning or end of a frothing process), such as, for example, method 200 described above.

Following the performance of the steps described above, method 300 includes a step 310 of retracting or removing the wand module 24 from the cleaning container 84. In an embodiment, this step may comprise the actuator 26, under the control of the ECU 28, causing the wand module 24 to be retracted (e.g., raised) from the cleaning container 84 and back to a position, for example, in which it is ready to perform another frothing process.

In an embodiment, method 300 is performed following the completion of each frothing process performed by the frothing assembly 22. In another embodiment, method 300 may not be performed after every frothing process, but rather may be performed after a certain number of processes have been performed. In yet another embodiment, certain aspects of method 300 may be performed after every process (e.g., performing step 306 just to clean the wand module 24), while other aspects may be performed only after a predetermined number of processes have been performed (e.g., performing step 306 to clean and sterilize the wand module 24 using, for example, different cleaning fluids/temperatures).

Figure 13:
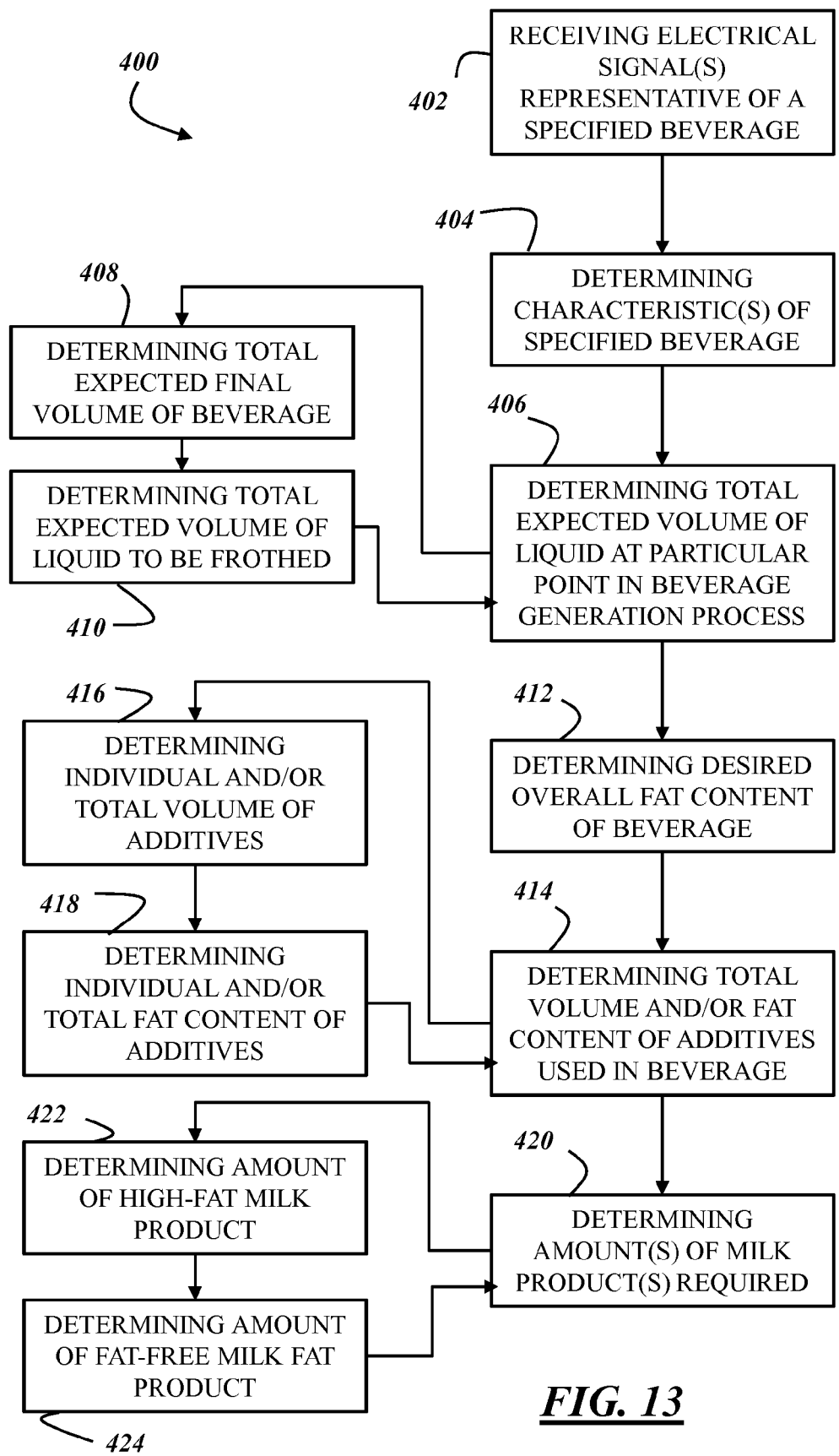
FIG. 13 is a flow diagram of an illustrative embodiment of operating an automated beverage generating system, and more particularly, a method for determining amounts or volumes of one or more milk products to be used in generating a beverage.

With reference to FIG. 13, there is shown a method 400 of operating an automated beverage generating system, and more particularly, a method for determining amounts or volumes of one or more milk products (e.g., a high-fat milk product and no-fat or fat-free milk) to be used in generating a beverage in order to meet a desired overall fat content for that beverage. For purposes of illustration and clarity, method 400 will be described in the context of the kiosk 10 described above. It will be appreciated, however, that the application of the present methodology is not meant to be limited solely to such an implementation, but rather method 400 may find application with any number of other types or implementations of automated beverage generating systems. Additionally, it should be noted that while the steps of method 400 will be described as being performed or carried out by one or more particular components of the kiosk 10 (e.g., the ECU 14), in other embodiments, some or all of the steps may be performed by one or more other components of the kiosk, or component(s) of a larger system of which the kiosk is a part (e.g., a control host). Accordingly, it will be appreciated that the present disclosure is not limited to an embodiment wherein particular components described herein are configured to perform the various steps.

In an embodiment, method 400 includes a step 402 of receiving one or more electrical signals representative of an order for a specified beverage. In an embodiment, the one or more electrical signals are ultimately received by the ECU 14 of the kiosk 10, and therefore, in such an embodiment, step 402 is performed by the ECU 14. The electrical signal(s) representative of the specified beverage may be generated in a number of ways. In an embodiment, a customer places an order for a desired beverage using, for example, a user input device of, or supported by, the kiosk 10 (e.g., the user input device 12), and the electrical signal(s) are generated in response thereto. More specifically, in an embodiment, the user input device 12 may include, or be configured to have displayed on a display device thereof, one or more graphical user interfaces (GUIs) that may be used to select a desired beverage. This may comprise, for example, selecting the desired beverage from one or more standard, predetermined beverages, or creating a more personalized or customized beverage by selecting particular characteristics, such as, for example, cup size, particular types and/or amounts of contents/ingredients to be used (e.g., additives, milk types, etc.), and the like to be used in the generation of the beverage. Once a customer has completed his/her order, the one or more electrical signals representative of the order may then be generated by, for example, the user input device 12, and a processing device thereof, in particular, and that or those electrical signal(s) may then be transmitted or communicated (e.g., over one or more wires or wirelessly) directly or indirectly to the ECU 14 of the kiosk 10.

Upon receipt of the one or more electrical signals representative of the order in step 402, method 400 may proceed to a step 404 of determining one or more characteristics or attributes of the specified beverage. These characteristics or attributes may include, for example, one or more of: the size of the beverage (e.g., cup size in fluid ounces); the particular type(s) and amount(s) (e.g., volume(s)) of the components/ingredients to be used; a particular type of frothing or stretching to be performed during the beverage generation process for the specified beverage; the desired overall fat content of the specified beverage; etc. Step 404 may be performed in a number of ways. For example, in an illustrative embodiment, step 404 comprises using the order received in step 402 and a data structure, for example, a one- or multiple-dimensional look-up table, that correlates ordered beverages with the characteristics/attributes of interest to determine the characteristics/attributes of interest. Accordingly, in such an embodiment, step 404 may comprise inputting or looking up the specified beverage in an appropriate data structure to determine the desired information. The data structure may be stored in an electronic memory device of the kiosk 10, and more particularly, an electronic memory device that is part of or accessible by the ECU 14 of the kiosk 10. While one particular way of performing step 404 has been provided, it will be appreciated that the present disclosure is not intended to be limited to any particular way of doing so; rather, any suitable way may be used. In an embodiment, step 404 is performed by the ECU 14.

Method 400 may further include a step 406 of determining a total expected volume of the liquid at a particular point of the beverage generating process. In an embodiment, the total expected volume may be the expected volume at the end of the beverage generating process, which may comprise an amount that is a predetermined amount less than the actual capacity of the cup in which the beverage is delivered to the customer (e.g., to allow for some room to be left in the cup to avoid/limit spilling). For example, if the cup is a 16 fl. oz. cup, the total expected volume of the liquid may be 14.5 fl. oz. In such an embodiment, the capacity of the cup may be determined in step 404 described above, and the ECU 14 may be configured to determine the total expected volume by either looking up the cup capacity in an appropriately configured look-up table stored in an electronic memory device of the kiosk 10, and more particularly, an electronic memory device that is part of or accessible by the ECU 14 of the kiosk 10, that correlates cup capacity with total expected volume. Alternatively, the ECU 14 may be configured to perform the calculation itself, or to determine the total expected volume using any other suitable technique.

In another embodiment, rather than the total expected volume being the expected volume at the end of the beverage generating process, the total expected volume may be the expected volume of the liquid prior to a process that is part of the overall beverage generating process being performed on the liquid. An example of one such process is a frothing or stretching process which serves to increase the volume of the liquid on which the process is performed.

In such an embodiment, the total expected volume may be determined in a number of ways. In one example, step 406 includes a first substep 408 of determining the expected volume of the beverage that will ultimately be delivered to the customer (i.e., the expected final volume), which, as described above, may comprise an amount that is a predetermined amount less than the actual capacity of the cup, is determined. As described with respect to the embodiment above, the ECU 14 may be configured to determine the expected final volume using an appropriately configured look-up table that correlates cup capacity (determined in step 404) with total expected volume, or the ECU 14 may be configured to perform the calculation itself.

In an embodiment, step 406 may further include a substep 410 of determining the expected volume of the liquid that will be frothed or stretched based, at least in part, on the expected final volume determined in substep 408. In other words, a pre-frothing or pre-stretching volume is determined in substep 410. In an embodiment, substep 410 may comprise, for example, using the expected final volume determined in substep 408 along with the type of frothing/stretching process to be performed (e.g., wet or dry) determined or acquired in step 404, to then determine the total pre-frothing volume of the liquid. More particularly, the ECU 14 may be configured to use the expected final volume from substep 408 and the type of frothing process from step 404 with a data structure, for example, a multi-dimensional look-up table, that correlates expected final volume and frothing type with total expect pre-frothing volume to determine the total expected pre-frothing volume. Accordingly, in such an embodiment, substep 410 may comprise inputting or looking up the expected final volume and the type of frothing process in an appropriate data structure to determine the total pre-frothing volume. The data structure may be stored in an electronic memory device of the kiosk 10, and more particularly, an electronic memory device that is part of or accessible by the ECU 14 of the kiosk 10.

Alternatively, the ECU 14 may be configured to execute one or more equations or algorithms to determine the total expected pre-frothing volume, or to determine this volume using any other suitable technique.

For example, the ECU 14 may be configured to first acquire or determine the total expected final volume of the beverage using one or more of the techniques described above. The ECU 14 may be further configured to then use the total expected final volume, along with a predetermined, empirically-derived constant (k) and a known, empirically-derived percentage by which the volume will be increased during the corresponding frothing process—both of which may be acquired by the ECU 14 from one or more memory devices of or accessible by the ECU 14, to determine the total expect pre-frothing volume of the liquid. By way of example, assume, for purposes of illustration only, that the capacity of the cup is 16 fl. oz. and the total final volume is 14.5 fl. oz. (so as to not overflow the cup with liquid at the end of the process). Assume further that the known constant has a value of k=2 and that the specified frothing process (e.g., a dry frothing process) is known to increase the volume of the liquid that is to be frothed by 0.45 (or 45%). Using this information, the ECU 14 may execute the equation: Tot. Exp. Pre-Froth Vol.=(Total Final Vol.−k)/(1+Percent. Vol. Increase) to come to a total pre-frothed volume of 8.62 fl. oz. (i.e., (14.5−2)/(1+0.45)=8.62).

Accordingly, it will be appreciated that the present disclosure is not limited to any particular technique for determining the total expected volume in step 406.

In addition to the above, method 400 may further include a step 412 of determining or acquiring the desired overall fat content of the specified beverage. The desired overall fat content may correspond to the milk fat content ascribed to the specified beverage, which may be a customer-defined or system default characteristic of the specified beverage. For example, if when the customer ordered the specified beverage, s/he indicated that 1% of milk fat was desired (i.e., s/he selected 1% milk to be used), that selection may be translated into the equivalent amount of fat in the entire specified beverage (i.e., at the end of the generation process, the beverage has an overall fat content that is equivalent to the fat content of 1% milk).

In an embodiment, the overall fat content is expressed in terms of grams of fat. The particular number of grams of fat may be determined or translated in a number of ways. In one embodiment, the ECU 14 may be configured to use customer-defined or system default desired milk fat and the total expected volume determined is step 406 with a data structure, for example, a multi-dimensional look-up table, that correlates desired milk fat content and total expected volume with overall fat content (in grams) to determine the desired overall fat content of the specified beverage (i.e., the desired number of fat grams for the beverage). Accordingly, in such an embodiment, step 412 may comprise inputting or looking up the total expected volume and the desired milk fat content in an appropriate data structure to determine the desired overall fat content of the beverage. As with the other data structure described above, the data structure used in step 412 may be stored in an electronic memory device of the kiosk 10, and more particularly, an electronic memory device that is part of or accessible by the ECU 14 of the kiosk 10. By way of example, assume, for purposes of illustration only, that the desired milk fat content was 1%. Assume further that a frothing process is required to be performed, and that the total expected pre-frothing volume of the liquid to be frothed is determined in step 406 to be, as set forth in the example above, 8.62 fl. oz. Using an appropriately-configured look-up table, the desired milk fat content of 1% and the total expected volume of 8.62 fl. oz. may be looked up in the look-up table and the desired overall fat content for the specified beverage may be determined to be 2.69 grams (i.e., the equivalent amount of fat in 8.62 fl. oz. of 1% fat milk).

Alternatively, the ECU 14 may be configured to execute one or more equations or algorithms to determine the desired overall fat content of the specified beverage, or to determine the overall fat content using any other suitable technique. Accordingly, the present disclosure is not limited to any particular technique for performing step 412.

Method 400 may include further a step 414 of determining the total volume and fat content of the particular additives or component ingredients of the specified beverage (other than the milk product). In an embodiment wherein the liquid is to be frothed, this will include all of the additives or ingredients in the liquid that is to be frothed. Step 414 may include a number of substeps.

For example, step 414 may include a first substep of 416 of determining the individual and/or total volume of the additives. In an embodiment, substep 416 may involve determining this or these volumes using certain information determined or received in step 404. This information may include the particular quantities of each additive that is used, which depending on the additive, may be in terms of packets of a known quantity (e.g., packets of sugar or sweeteners), shots of known quantities (e.g., liquid additives such as, for example, chocolate and other flavorings), or other quantitative measure. For example, using information determined or acquired in step 404, the individual and total volumes (i.e., in fl. oz.) of the additives may be determined in a substep 416. In an embodiment, the ECU 14 may be configured to use the respective quantities of the additives from step 404 with one or more data structures (e.g., one for each additive or one or more that may be used for multiple additives), for example, a look-up table, that correlates additive types and quantities with corresponding volumes to determine the equivalent volume of the quantity of each additive. As with the other data structures described above, the data structure(s) may be stored in an electronic memory device of the kiosk 10, and more particularly, an electronic memory device that is part of or accessible by the ECU 14 of the kiosk 10. By way of example, assume, for purposes of illustration only, that the specified beverage includes the following three (3) additives and their respective quantities: three (3) packets of sugar; four (4) shots of sugar-free vanilla; and two (2) shots of chocolate. Using one or more appropriately-configured look-up tables, these particular amounts of additives may be translated into the following volumes: 0.75 fl. oz. of sugar; 1.00 fl. oz. of sugar-free vanilla; and 0.5 fl. oz. of chocolate, for a total of 2.25 fl. oz.

Alternatively, the ECU 14 may be configured to execute one or more equations or algorithms to determine the volume of the relevant additives, or to determine this volume using any other suitable technique. Accordingly, the present disclosure is not limited to any particular technique for performing substep 416.

Step 414 may further include another substep 418 of determining the total fat content corresponding to the particular quantities/volumes of the additives. Similar to substep 416, in an embodiment, the ECU 14 may be configured to use the respective quantities of the additives determined or acquired in step 404 and/or the corresponding volumes determined in substep 416 with one or more data structures (e.g., one for each additive or one or more that may be used for multiple additives), for example, a look-up table, that correlates additive types and quantities and/or volumes with corresponding fat contents to determine the fat content of a particular quantity or volume of each additive. The data structure(s) may be stored in an electronic memory device of the kiosk 10, and more particularly, an electronic memory device that is part of or accessible by the ECU 14 of the kiosk 10. For purposes of illustration, and taking the example above wherein the specified beverage includes the following three (3) additives: three (3) packets of sugar; four (4) shots of sugar-free vanilla; and two (2) shots of chocolate, using one or more appropriately-configured look-up tables, these particular quantities of additives may be translated into the following respective fat contents: sugar—0.0 grams; sugar-free vanilla—0.0 grams; and chocolate—0.5 grams, for a total fat content of 0.5 grams.

As with the substep 416 described above, the ECU 14 may be alternatively configured to execute one or more equations or algorithms to determine the fat contents of the individual additives and/or a total fat content, or to determine this information using any other suitable technique. Accordingly, the present disclosure is not limited to any particular technique for performing substep 418.

Using some or all of the information determined or otherwise obtained in one or more of the aforementioned steps, method 400 may further include a step 420 of determining the respective amounts of one or more different types of milk product to bring the overall actual fat content of the specified beverage in-line with the desired overall fat content, and/or to ultimately meet the total expected volume of the beverage determined in step 406.

To determine the amount of a high-fat milk product that is required to meet the desired overall fat content for the beverage in a substep 422 of step 420, the ECU 14 may be configured to first determine the particular amount of fat that is required to meet the desired overall fat content. In an embodiment, the ECU 14 may be configured to simply subtract the total fat content of the additives determined in substep 418 of step 414 from the desired overall fat content of the specified beverage determined in step 412 to determine the amount of fat in grams that is needed. That number may then be used to determine the quantity of a high-fat milk product, for example, half-and-half, that is required to bring the fat content of the beverage to the desired overall fat content. In one embodiment, the ECU 14 may be configured to use the number representing the required amount of fat with a data structure, for example, a look-up table, that correlates fat grams with quantity or volume of the high-fat milk product to determine the amount of high-fat milk that is required. The data structure(s) may be stored in an electronic memory device of the kiosk 10, and more particularly, an electronic memory device that is part of or accessible by the ECU 14 of the kiosk 10. By way of illustration, and using the examples previously described above, assume that the desired overall fat content of the beverage is 2.69 grams, and that the total fat content of the additives is 0.5 grams. The total number of grams of fat needed is 2.19 grams. Using an appropriately-configured look-up table, the required number of fat grams, 2.19 grams, may be looked up in the look-up table and a required quantity or volume of high-fat milk (e.g., half and half) may be determined to be 0.63 fl. oz.

Alternatively, the ECU 14 may be configured to execute one or more equations or algorithms to determine the quantity of high-fat milk that needs to be added to the liquid, or to determine this quantity using any other suitable technique.

To determine, in a substep 424 of step 420, the amount of another milk product that is required to meet the total expected volume that was determined in step 406, the ECU 14 may be configured to simply subtract the total volume of the additives and high-fat milk determined in substep 416 of step 414 and substep 422 of step 420, respectively, from the total expected volume determined in step 406. The resulting number represents the required amount or volume of no-fat or fat-free milk product (e.g., skim milk) to be used. Accordingly, in an embodiment, the substep 424 may first require that the total additive volume and the volume of the high-fat milk be added together, which, in an embodiment, the ECU 14 may be configured to do, and then that total or cumulative volume may be used to determine the volume of non-fat or fat-free milk to be used. By way of illustration, and using the examples previously described above wherein the total expected volume determined in step 406 is a total expected pre-frothing volume, the total volume of the additives (i.e., 2.25 fl. oz.) and high-fat milk (i.e., 0.63 fl. oz.) is 2.88 fl. oz., and the total expected volume is 8.62 fl. oz. Accordingly, the total amount of no-fat milk that is required is 5.74 fl. oz.

Alternatively, the ECU 14 may be configured to determine the required amount or volume of no-fat milk product using any other suitable technique.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An automated frothing assembly, comprising:
a wand module, the wand module including an elongate member having
an inlet,
a first pair of outlets and a second pair of outlets wherein each outlet of the first pair of outlets and the second pair of outlets comprises a through-going passageway extending from an interior surface of the elongate member through an exterior surface of the elongate member, and
a fluid passageway extending between and in fluid communication with the inlet and each outlet of the first pair of outlets and the second pair of outlets,
wherein:
each outlet of the first pair of outlets and the second pair of outlets extends at a non-zero acute angle relative to a horizontal plane that is perpendicular to a centerline of the elongate member,
the first pair of outlets are laterally-spaced from each other and extend at a first acute angle relative to the horizontal plane, and the second pair of outlets are laterally-spaced from each other and extend at a second acute angle relative to the horizontal plane that is different than the first acute angle, and
at least one outlet of the first pair of outlets extends in a first vertical plane that is parallel to but does not contain the centerline of the elongate member, and at least one outlet of the second pair of outlets extends in a second vertical plane that is orthogonal to the first vertical plane;

an actuator configured to be operatively coupled to the wand module and to drive movement of at least a portion of the wand module along an axis; and an electronic controller configured to be electrically coupled to the actuator and to control an operation of the actuator to control the movement of the wand module.

2. The assembly of claim 1, wherein the actuator is configured to drive the movement of the at least a portion of the wand module along only one axis.

3. The assembly of claim 1, wherein the wand module further comprises a splash guard.

4. The assembly of claim 1, further comprising a mounting arm configured to be coupled between the wand module and the actuator to operatively couple the wand module to the actuator, the mounting arm having an inlet, an outlet, and a fluid passageway extending therebetween, the inlet being configured to be fluidly coupled to a fluid source and the outlet being configured to be fluidly coupled to the inlet of the elongate member of the wand module.

5. The assembly of claim 1, wherein the electronic controller is configured to determine one or more operating parameters to be used during a frothing process based on at least one characteristic relating to liquid that is to be frothed.

6. The assembly of claim 5, wherein the electronic controller is configured to determine a plurality of operating parameters to be used during the frothing process by selecting a frothing profile containing the plurality of operating parameters from a plurality of empirically-derived frothing profiles based on the at least one characteristic relating to the liquid that is to be frothed.

7. The assembly of claim 5, wherein the one or more operating parameters comprise at least one of:
a start position of the wand module;
an end position of the wand module;
a rate at which the wand module is moved from the start position to the end position;
a temperature that the liquid being frothed is to reach and to be maintained at during the frothing process;
an amount of time that heat should be applied to the liquid being frothed; or
a steam cut-off position.

8. The assembly of claim 5, wherein the at least one characteristic includes at least one of:
a total fat content of the liquid; a total volume of the liquid; a weight of the liquid; or a size of a cup containing the liquid.

9. The assembly of claim 1, further comprising at least one sensor configured to be electrically coupled to the electronic controller and to sense at least one characteristic relating to liquid to be frothed by the frothing assembly, and wherein the electronic controller is configured to receive one or more electrical signals representative of the at least one characteristic from the sensor and to control the operation of the frothing assembly in response thereto.

10. The assembly of claim 1, further comprising a steam generator operatively coupled to the inlet of the elongate member of the wand module and electrically coupled to the electronic controller, wherein the electronic controller is configured to control the operation of the steam generator to selectively supply steam to the wand module.

11. A wand module for use in performing a frothing process on a liquid in container, the wand module comprising an elongate member having:
an inlet;
a first pair of outlets and a second pair of outlets wherein each outlet of the first pair of outlets and the second pair of outlets comprises a through-going passageway extending from an interior surface of the elongate member through an exterior surface of the elongate member; and
a fluid passageway extending between and in fluid communication with the inlet and the at least one outlet;
wherein:
each outlet of the first pair of outlets and the second pair of outlets extends at a non-zero angle relative to a horizontal plane that is perpendicular to a centerline of the elongate member, and
the first pair of outlets are laterally-spaced from each other and extend at a first acute angle relative to the horizontal plane, and the second pair of outlets are laterally spaced from each other and extend at a second acute angle relative to the horizontal plane that is different than the first acute angle, and
at least one outlet of the first pair of outlets extends in a first vertical plane that is parallel to but does not container the centerline of the elongate member, and at least one outlet of the second pair of outlets extends in a second vertical plane that is orthogonal to the first vertical plane.

12. The wand module of claim 11, wherein the second vertical plane is parallel to, but does not contain, the centerline of the elongate member.

13. The wand module of claim 11, wherein the outlets of the first pair of outlets extend in respective vertical planes that are parallel to each other and the centerline of the elongate member, but that do not contain the centerline of the elongate member, and the outlets of the second pair of outlets extend in respective vertical planes that are parallel to each other and orthogonal to the vertical planes in which the outlets of the first pair of outlets extend.

14. The wand module of claim 11, wherein the first pair of outlets are axially-spaced from the second pair of outlets.

15. The wand module of claim 11, further comprising a splash guard disposed proximate the first end of the elongate member.

16. A frothing assembly comprising: the wand module of claim 11; and an actuator configured to be operatively coupled to the wand module, wherein the actuator is further configured to drive movement of at least a portion of the wand module along only one axis.

* * * * *